US012792492B2

(12) United States Patent
Williams et al.

(10) Patent No.: US 12,792,492 B2
(45) Date of Patent: Nov. 10, 2026

(54) GENERATIVE ARTIFICIAL INTELLIGENCE FOR SOURCE CODE SECURITY VULNERABILITY INSPECTION AND REMEDIATION

(71) Applicant: STATE FARM MUTUAL AUTOMOBILE INSURANCE COMPANY, Bloomington, IL (US)

(72) Inventors: Aaron Williams, Congerville, IL (US); Joseph Harr, Bloomington, IL (US); Scott T. Christensen, Salem, OR (US); Ryan M. Gross, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 60 days.

(21) Appl. No.: 18/215,981

(22) Filed: Jun. 29, 2023

(65) Prior Publication Data

US 2024/0330151 A1 Oct. 3, 2024

Related U.S. Application Data

(60) Provisional application No. 63/463,383, filed on May 2, 2023, provisional application No. 63/456,704, filed on Apr. 3, 2023.

(51) Int. Cl.
*G06F 11/362* (2025.01)
*G06F 21/62* (2013.01)
(Continued)

(52) U.S. Cl.
CPC ...... *G06F 11/3624* (2013.01); *G06F 21/6245* (2013.01); *G06N 20/00* (2019.01);
(Continued)

(58) Field of Classification Search
CPC .. G06F 11/36; G06F 11/3624; G06F 21/6245; G06N 20/00; H04L 51/02;
(Continued)

(56) References Cited

U.S. PATENT DOCUMENTS

| | | | |
|---|---|---|---|
| 7,523,060 | B1 | 4/2009 | Tenorio |
| 8,682,804 | B1 | 3/2014 | Yoon |

(Continued)

FOREIGN PATENT DOCUMENTS

| | | | |
|---|---|---|---|
| CN | 110175229 A | 8/2019 | |
| CN | 114742657 A | 7/2022 | |

(Continued)

OTHER PUBLICATIONS

Limra, Should Financial Services Companies Consider Open AI? Web page downloaded from Internet at <https://www.limra.com/en/trending-topics/publications/marketfacts/2023/should-financial-services-companies-consider-open-ai>. Retrieved from Internet on Apr. 28, 2023.

(Continued)

*Primary Examiner* — Ziaul A Chowdhury
(74) *Attorney, Agent, or Firm* — MARSHALL, GERSTEIN & BORUN LLP

(57) ABSTRACT

A computer system for inspecting source code for security vulnerabilities may include one or more processors configured to: send source code and a prompt for code checking to an ML chatbot (or voice bot) to cause an ML model to inspect the source code for security vulnerabilities, determine whether there is a security vulnerability in the source code based on a response from the ML chatbot (or voice bot), and/or responsive to determining that there is a security vulnerability in the source code, communicate the security vulnerability to a user associated with the source code.

14 Claims, 12 Drawing Sheets

(51) Int. Cl.
*G06N 20/00* (2019.01)
*H04L 9/40* (2022.01)
*H04L 51/02* (2022.01)

(52) U.S. Cl.
CPC .......... *H04L 51/02* (2013.01); *H04L 63/1416* (2013.01); *H04L 63/1433* (2013.01); *H04L 63/1441* (2013.01); *H04L 63/20* (2013.01)

(58) Field of Classification Search
CPC ............. H04L 63/1416; H04L 63/1433; H04L 63/1441; H04L 63/20
See application file for complete search history.

(56) References Cited

U.S. PATENT DOCUMENTS

| | | | |
|---|---|---|---|
| 9,270,711 | B1 | 2/2016 | Rowland et al. |
| 9,888,397 | B1 | 2/2018 | Puranik et al. |
| 10,107,708 | B1 | 10/2018 | Schick et al. |
| 10,409,995 | B1 * | 9/2019 | Wasiq ...................... H04L 9/08 |
| 10,733,383 | B1 | 8/2020 | Shah et al. |
| 11,017,466 | B1 | 5/2021 | Cunningham et al. |
| 11,238,521 | B2 | 2/2022 | Malkiel et al. |
| 11,270,331 | B1 | 3/2022 | Breitweiser et al. |
| 11,314,846 | B1 | 4/2022 | Colin et al. |
| 11,444,893 | B1 | 9/2022 | Kalluri |
| 11,538,112 | B1 | 12/2022 | Singh et al. |
| 11,593,685 | B1 | 2/2023 | Chan et al. |
| 11,595,243 | B1 | 2/2023 | Schreiber et al. |
| 11,645,253 | B1 | 5/2023 | Xing et al. |
| 11,676,202 | B1 | 6/2023 | Latronico et al. |
| 11,726,889 | B1 | 8/2023 | Rao et al. |
| 11,763,148 | B2 | 9/2023 | Milman et al. |
| 11,769,013 | B2 | 9/2023 | Machado et al. |
| 11,803,849 | B1 | 10/2023 | Lawrence |
| 11,900,451 | B1 | 2/2024 | King et al. |
| 11,929,963 | B1 | 3/2024 | Zheng |
| 11,942,079 | B2 | 3/2024 | Chun et al. |
| 11,989,636 | B1 | 5/2024 | Leeds et al. |
| 12,181,844 | B2 | 12/2024 | Ramanasankaran et al. |
| 2006/0195335 | A1 | 8/2006 | Christian et al. |
| 2007/0088588 | A1 | 4/2007 | Schaffer |
| 2007/0233535 | A1 | 10/2007 | Kim |
| 2008/0196099 | A1 | 8/2008 | Shastri |
| 2008/0266382 | A1 | 10/2008 | Smith et al. |
| 2009/0248789 | A1 | 10/2009 | Fong |
| 2010/0161503 | A1 | 6/2010 | Foster |
| 2012/0054040 | A1 | 3/2012 | Bagherjeiran et al. |
| 2013/0151533 | A1 | 6/2013 | Udupa et al. |
| 2013/0191223 | A1 | 7/2013 | Harris et al. |
| 2015/0128246 | A1 | 5/2015 | Feghali et al. |
| 2016/0156574 | A1 | 6/2016 | Hum et al. |
| 2016/0196511 | A1 | 7/2016 | Anisingaraju et al. |
| 2016/0260033 | A1 | 9/2016 | Keyngnaert et al. |
| 2016/0379284 | A1 | 12/2016 | Alizadeh et al. |
| 2017/0075877 | A1 | 3/2017 | Lepeltier |
| 2017/0353991 | A1 | 12/2017 | Tapia |
| 2018/0013783 | A1 | 1/2018 | Anachi |
| 2018/0048595 | A1 | 2/2018 | Dotan-Cohen et al. |
| 2018/0090137 | A1 | 3/2018 | Horling et al. |
| 2018/0121657 | A1 * | 5/2018 | Hay ........................ G06F 21/51 |
| 2018/0121808 | A1 | 5/2018 | Ramakrishna et al. |
| 2018/0150739 | A1 | 5/2018 | Wu |
| 2018/0189739 | A1 | 7/2018 | Kenthapadi et al. |
| 2018/0253780 | A1 | 9/2018 | Wang et al. |
| 2019/0005024 | A1 | 1/2019 | Somech et al. |
| 2019/0043483 | A1 | 2/2019 | Chakraborty et al. |
| 2019/0050319 | A1 * | 2/2019 | Gondalia ............ G06F 11/3616 |
| 2019/0087865 | A1 | 3/2019 | Loree et al. |
| 2019/0089725 | A1 | 3/2019 | Anachi |
| 2019/0114395 | A1 | 4/2019 | Lenchner et al. |
| 2019/0122232 | A1 | 4/2019 | Leidi et al. |
| 2019/0141058 | A1 | 5/2019 | Hassanzadeh et al. |
| 2019/0228099 | A1 | 7/2019 | Bajaj et al. |
| 2019/0303798 | A1 | 10/2019 | Xie et al. |
| 2019/0384670 | A1 | 12/2019 | Kuroki et al. |
| 2020/0012958 | A1 | 1/2020 | Natanson et al. |
| 2020/0053117 | A1 | 2/2020 | Mandal |
| 2020/0133756 | A1 | 4/2020 | Sun et al. |
| 2020/0184017 | A1 | 6/2020 | Batra et al. |
| 2020/0258045 | A1 | 8/2020 | Knupfer |
| 2020/0259700 | A1 | 8/2020 | Bhalla et al. |
| 2020/0259701 | A1 | 8/2020 | Povoa |
| 2020/0272994 | A1 | 8/2020 | Silveira et al. |
| 2020/0327172 | A1 | 10/2020 | Coquard et al. |
| 2020/0334580 | A1 | 10/2020 | Sheopuri et al. |
| 2020/0342032 | A1 | 10/2020 | Subramaniam et al. |
| 2020/0372823 | A1 | 11/2020 | Edwards et al. |
| 2021/0021636 | A1 | 1/2021 | Sbandi |
| 2021/0056007 | A1 * | 2/2021 | Viswanathan ...... G06F 11/3688 |
| 2021/0081819 | A1 | 3/2021 | Polleri et al. |
| 2021/0083994 | A1 | 3/2021 | Pan et al. |
| 2021/0133807 | A1 | 5/2021 | Kini et al. |
| 2021/0141862 | A1 | 5/2021 | Huang et al. |
| 2021/0166244 | A1 | 6/2021 | Basam |
| 2021/0232613 | A1 | 7/2021 | Raval et al. |
| 2021/0249017 | A1 | 8/2021 | Burris et al. |
| 2021/0312561 | A1 | 10/2021 | Speasl et al. |
| 2021/0326757 | A1 | 10/2021 | Rawat et al. |
| 2021/0342918 | A1 | 11/2021 | Price et al. |
| 2021/0342946 | A1 | 11/2021 | Leise et al. |
| 2021/0349955 | A1 | 11/2021 | Megill et al. |
| 2021/0374168 | A1 | 12/2021 | Srinivasan et al. |
| 2022/0004479 | A1 | 1/2022 | Mccawley et al. |
| 2022/0012357 | A1 | 1/2022 | Rajeev |
| 2022/0019496 | A1 | 1/2022 | Lozano et al. |
| 2022/0094649 | A1 | 3/2022 | Le |
| 2022/0107858 | A1 | 4/2022 | Jain et al. |
| 2022/0114340 | A1 | 4/2022 | Graeser et al. |
| 2022/0129261 | A1 * | 4/2022 | Cabrera Lozoya ....... G06F 8/40 |
| 2022/0138161 | A1 | 5/2022 | Anjum et al. |
| 2022/0138690 | A1 | 5/2022 | Anjum et al. |
| 2022/0148113 | A1 | 5/2022 | Mejia et al. |
| 2022/0156298 | A1 | 5/2022 | Mahmoud et al. |
| 2022/0229860 | A1 | 7/2022 | Ship et al. |
| 2022/0229978 | A1 | 7/2022 | Ship et al. |
| 2022/0244847 | A1 | 8/2022 | Margot et al. |
| 2022/0261711 | A1 | 8/2022 | Krishna et al. |
| 2022/0270120 | A1 | 8/2022 | King |
| 2022/0308943 | A1 | 9/2022 | Srinivasan et al. |
| 2022/0351281 | A1 | 11/2022 | Morgan et al. |
| 2022/0358225 | A1 | 11/2022 | Gadde et al. |
| 2022/0374483 | A1 | 11/2022 | Hunt |
| 2022/0374598 | A1 | 11/2022 | Osuala et al. |
| 2022/0397411 | A1 | 12/2022 | Brown et al. |
| 2022/0398492 | A1 | 12/2022 | Navon et al. |
| 2022/0400159 | A1 | 12/2022 | Chi et al. |
| 2023/0018065 | A1 | 1/2023 | Schmitt et al. |
| 2023/0033680 | A1 | 2/2023 | Whatley |
| 2023/0069434 | A1 | 3/2023 | Cheng et al. |
| 2023/0070701 | A1 | 3/2023 | Wang et al. |
| 2023/0074406 | A1 | 3/2023 | Baeuml et al. |
| 2023/0080589 | A1 | 3/2023 | Gupta et al. |
| 2023/0080724 | A1 | 3/2023 | Stoops et al. |
| 2023/0092334 | A1 | 3/2023 | Vendrow |
| 2023/0092651 | A1 | 3/2023 | Joshi et al. |
| 2023/0099424 | A1 | 3/2023 | Hawkinson et al. |
| 2023/0110941 | A1 | 4/2023 | Makhija et al. |
| 2023/0120174 | A1 * | 4/2023 | Seck ..................... G06F 21/552 726/25 |
| 2023/0124948 | A1 | 4/2023 | Li et al. |
| 2023/0135162 | A1 | 5/2023 | Cohen et al. |
| 2023/0252342 | A1 | 8/2023 | Stewart et al. |
| 2023/0273783 | A1 | 8/2023 | Molander et al. |
| 2023/0297887 | A1 | 9/2023 | Gurgu et al. |
| 2023/0316141 | A1 | 10/2023 | Toporek et al. |
| 2023/0316339 | A1 | 10/2023 | Anderson et al. |
| 2023/0367669 | A1 | 11/2023 | Tiwari et al. |
| 2023/0379273 | A1 | 11/2023 | Yannam et al. |
| 2023/0386657 | A1 | 11/2023 | Pascal et al. |
| 2023/0396568 | A1 | 12/2023 | Lutsyshyn |
| 2023/0401387 | A1 | 12/2023 | Alexander et al. |
| 2023/0401660 | A1 | 12/2023 | Ambrosch et al. |
| 2024/0037343 | A1 | 2/2024 | Miller et al. |

(56) References Cited

U.S. PATENT DOCUMENTS

| | | | | |
|---|---|---|---|---|
| 2024/0037896 | A1 | 2/2024 | Zhang et al. | |
| 2024/0045971 | A1* | 2/2024 | Ben Salem ............. | G06F 21/54 |
| 2024/0054430 | A1 | 2/2024 | Maikhuri et al. | |
| 2024/0061835 | A1 | 2/2024 | Subramanian et al. | |
| 2024/0144372 | A1 | 5/2024 | Wu et al. | |
| 2024/0169163 | A1 | 5/2024 | Nguyen | |
| 2024/0171480 | A1 | 5/2024 | Sheoran et al. | |
| 2024/0184892 | A1* | 6/2024 | Ganz ..................... | G06F 21/577 |
| 2024/0194180 | A1 | 6/2024 | Goldshtein et al. | |
| 2024/0202452 | A1 | 6/2024 | Schillace et al. | |
| 2024/0202457 | A1 | 6/2024 | Yogerst et al. | |
| 2024/0202571 | A1 | 6/2024 | Yaghi et al. | |
| 2024/0202572 | A1 | 6/2024 | Morales et al. | |
| 2024/0211799 | A1 | 6/2024 | Mazor | |
| 2024/0220674 | A1 | 7/2024 | Lopez et al. | |
| 2024/0249318 | A1 | 7/2024 | Spiegel et al. | |
| 2024/0256429 | A1 | 8/2024 | Lucioni et al. | |
| 2024/0257209 | A1 | 8/2024 | Wang et al. | |
| 2024/0267243 | A1 | 8/2024 | Ning et al. | |
| 2024/0267344 | A1 | 8/2024 | Mulligan et al. | |
| 2024/0281677 | A1 | 8/2024 | Mifflin | |
| 2024/0281706 | A1 | 8/2024 | Marzinzik et al. | |
| 2024/0283697 | A1 | 8/2024 | Bates-Maricle | |
| 2024/0289113 | A1 | 8/2024 | Bates-Maricle | |
| 2024/0289872 | A1 | 8/2024 | Fields et al. | |
| 2024/0291777 | A1 | 8/2024 | Fields et al. | |
| 2024/0291778 | A1 | 8/2024 | Fields et al. | |
| 2024/0291779 | A1 | 8/2024 | Catalano et al. | |
| 2024/0291785 | A1 | 8/2024 | Fields et al. | |
| 2024/0296489 | A1 | 9/2024 | Brannan | |
| 2024/0311618 | A1 | 9/2024 | Sukhavasi et al. | |
| 2024/0330455 | A1* | 10/2024 | Sahu ..................... | G06F 21/577 |
| 2024/0330504 | A1 | 10/2024 | Williams et al. | |
| 2024/0330654 | A1 | 10/2024 | Williams et al. | |
| 2024/0331043 | A1 | 10/2024 | Williams et al. | |
| 2024/0333728 | A1 | 10/2024 | Williams et al. | |
| 2024/0333746 | A1 | 10/2024 | Williams et al. | |
| 2024/0394503 | A1 | 11/2024 | Gutierrez et al. | |
| 2024/0394593 | A1 | 11/2024 | Gutierrez et al. | |
| 2024/0403566 | A1 | 12/2024 | Sengupta et al. | |
| 2024/0412145 | A1 | 12/2024 | Wheeler et al. | |
| 2024/0412168 | A1 | 12/2024 | Shrader | |
| 2024/0412313 | A1 | 12/2024 | Wheeler et al. | |
| 2024/0428259 | A1 | 12/2024 | Wheeler et al. | |
| 2024/0430702 | A1 | 12/2024 | Chandran et al. | |
| 2025/0022071 | A1 | 1/2025 | Gutierrez et al. | |
| 2025/0029192 | A1 | 1/2025 | Wheeler et al. | |
| 2025/0363035 | A1 | 11/2025 | Albert | |

FOREIGN PATENT DOCUMENTS

| | | | |
|---|---|---|---|
| JP | 2019-514117 | A | 5/2019 |
| KR | 10-2023-0018065 | A | 2/2023 |
| KR | 10-2619905 | B1 | 1/2024 |
| WO | 2020/198392 | A1 | 10/2020 |
| WO | 2021/092164 | A1 | 5/2021 |
| WO | 2024/112887 | A1 | 5/2024 |

OTHER PUBLICATIONS

Financial Times, “Insurer Zurich experiments with ChatGPT for claims and data mining” Web page downloaded from Internet at <https://www.ft.com/content/45e5525c-ac45-4a49-a55c-8833d1a036b9 >. Retrieved from internet on Apr. 25, 2023.

Ignites, “Morgan Stanley Developing Chatbot with OpenAI” Web page downloaded from the Internet at <https://www.ignites.com/pc/3979274/514654?all=true>. Retrieved from Internet on Apr. 25, 2023.

Ignites, “The Compliance Tasks Chat GPT Can (and Can’t) Handle” Web page downloaded from the Internet at <https://www.ignites.com/pc/4002214/518634?all=true>. Retrieved from the Internet on Apr. 25, 2023.

Life Annuity Specialist, “What ChatGPT’s Chores May Look Like in Life Insurance Industry” Web page downloaded from the Internet at <https://www.lifeannuityspecialist.com/pc/4031524/521574?all=true>. Retrieved from the Internet on Apr. 25, 2023.

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk- floatbot-activity-7089664064603234304- 60TU?utm source=share&utm medium=member android> (2023).

Unknown, “GPT-3 vs GPT-4 | What’s the difference?”, Jan. 2023, botpress.com, web.archive.org/web/20230131033431/https://botpress.com/blog/gpt-3-vs-gpt-4-whats-the-difference (Year: 2023).

OpenPR Worldwide Public Relations, Press release, “Floatbot.AI Unveils Revolutionary Agent M—Generative AI (LLM or ChatGPT) Based Master Agent developer framework,” Web page downloaded from Internet at <https://www.openpr.com/news/3147235/floatbot-ai-unveils-revolutionary-agent-m-generative-ai-llm>. Retrieved from Internet on Aug. 1, 2023.

Anonymous, Roots Automation Introduces InsurGPT—the World’s Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Bodea, Constanta-Nicoleta, Maria-Iuliana Dascalu, and Alexandru Hang. “Chatbot-based training for project management: . . . ” Research on project, programme and portfolio management: Integrating sustainability into project management. Springer International Publishing, 2021. (Year: 2021).

Casillo et al. “Chatbot in industry 4.0: An approach for training new employees.” 2020 IEEE International Conference on Teaching, Assessment, and Learning for Engineering (TALE). IEEE, 2020. (Year: 2020).

Clarizia et al. “E-learning and industry 4.0: A chatbot for training employees.” Proceedings of Fifth International Congress on Information and Communication Technology: ICICT 2020, London, vol. 2. Springer Singapore, 2021. (Year: 2021).

Dovetail Software. “The Ultimate Guide to Conversational AI Chatbots for HR.” Dovetail Software Blog, Mar. 12, 2022 (last accessed on Jul. 8, 2025 at https://blog.dovetailsoftware.com/hr/ultimate-guide-to-ai-chatbots-for-hr). (Year: 2022).

English language translation of above-mentioned CN Pat. App. Pub. No. 110175229 A to Chen et al. (Year: 2019).

Grensing-Pophal, Lin. “How HR Is Using Virtual Chat and Chatbots.” SHRM News, May 24, 2022 (last accessed on Jul. 8, 2025 at https://www.shrm.org/topics-tools/news/technology/how-hr-using-virtual-chat-chatbots). (Year: 2022).

Nguyen et al., “Deep Learning and Handheld Augmented Reality Based System for Optimal Data Collection in Fault Diagnostics Domain.” arXiv preprint arXiv:2206.07772 (2022). (Year: 2022).

Shao, “Communication Fault Diagnosis Algorithm Based on BP Neural Network” 2021 3rd International Conference on Intelligent Control, Measurement and Signal Processing and Intelligent Oil Field (ICMSP), Xi’an, China, 2021, pp. 239-243, doi: 10.1109/ICMSP53480.2021.9513359. (Year: 2021).

(56) References Cited

OTHER PUBLICATIONS

Suresh et al. "Career counseling chatbot on Facebook messenger using AI." Proceedings of the International Conference on Data Science, Machine Learning and Artificial Intelligence. 2021. (Year: 2021).
Panjaitan, Hapizin Yonani, and Renny Risqiani. "Antecedents of Customer Satisfaction Towards Chatbot on Used Car Buying and Selling Platforms in Indonesia." APMBA (Asia Pacific Management and Business Application) 12.3 (2024): 315-334.
JP 2019514117A (Machine translation); 2025 (Year: 2025).
Arshad, et al. "VocaVisionary: A Career Guidance Chatbot." 2024 Second International Conference on Advances in Information Technology (ICAIT). vol. 1. IEEE, 2024. (Year: 2024).
Ouyang et al., Training language models to follow instructions with human feedback, Cornell University (Mar. 4, 2022).
Prakash, Sajay, Koushik Sundar, and Eashaan Manohar. "Career Connect—A Personalized Job Recommendation AI Chatbot." (2024). (Year: 2024).
Yager, "Domain-Specific chatbots for science using embeddings", Jun. 2023, Royal Society of Chemistry, pp. 1-12, downloaded from https://pubs.rsc.org/en/content/articlepdf/2023/dd/d3dd00112a, D0I:10.1039/D3DD00112A (Year: 2023).

* cited by examiner

GENERATIVE ARTIFICIAL INTELLIGENCE FOR SOURCE CODE SECURITY VULNERABILITY INSPECTION AND REMEDIATION

CROSS-REFERENCE TO RELATED APPLICATIONS

This application claims priority to and the benefit of the filing date of provisional U.S. Patent Application No. 63/456,704 entitled "GENERATIVE ARTIFICIAL INTELLIGENCE AS A NETWORK AND APPLICATION SECURITY MEASURE," filed on Apr. 2, 2023, and provisional U.S. Patent Application No. 63/463,383 entitled "GENERATIVE ARTIFICIAL INTELLIGENCE AS A NETWORK AND APPLICATION SECURITY MEASURE," filed on May 2, 2023, the entire contents of both applications is hereby expressly incorporated herein by reference.

FIELD OF THE INVENTION

The present disclosure generally relates to security and privacy inspection and enforcement, and in particular, source code vulnerability inspection and remediation, network security scanning, abnormal network traffic detection, and privacy inspection and enforcement for unstructured data.

BACKGROUND

Source code for an application may contain security vulnerabilities. Manual review of source code by a human may be time consuming, and keyword searches of source code may be generally ineffective. Moreover, as new security vulnerabilities emerge or new versions of the source code are generated, additional source code reviews may be required.

Networked computing devices may contain security vulnerabilities. Administrators may be unaware of what networked computing devices may be present on their network and what vulnerabilities those networked computing devices may contain. Human generated code and signatures may not be sufficient to detect network security vulnerabilities in networked computing devices.

Network traffic may contain malicious traffic, such as worms, denial of service attacks, and hacker reconnaissance or exploits. Such malicious traffic may not be detected by a signature-based network intrusion detection system.

A computer system may receive unstructured data lacking data field definitions. The unstructured data may contain individuals' private information, such as social security numbers. Storage or transmission of this private information may violate privacy laws or an organization's privacy policy.

The conventional source code vulnerability inspection and remediation, network security scanning, abnormal network traffic detection, and privacy inspection and enforcement techniques may include additional shortcomings, inefficiencies, encumbrances, ineffectiveness, and/or other drawbacks.

SUMMARY

The present embodiments may relate to, inter alia, systems and methods for source code vulnerability inspection and remediation using machine learning (ML) and/or artificial intelligence (AI).

In one aspect, computer-implemented method for inspecting source code for security vulnerabilities using machine learning (ML) may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) sending, by one or more processors, source code and a prompt for code checking to an ML chatbot (or voice bot) to cause an ML model to inspect the source code for security vulnerabilities using test cases for the security vulnerabilities; (2) determining, by the one or more processors, whether there may be a security vulnerability in the source code based on a response from the ML chatbot (or voice bot); and/or (3) responsive to determining that there may be a security vulnerability in the source code, communicating, by the one or more processors, the security vulnerability to a user associated with the source code. The method may include additional, less, or alternate functionality or actions, including those discussed elsewhere herein.

In another aspect, a computer system for inspecting source code for security vulnerabilities using ML may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer system may include one or more processors configured to: (1) send source code and a prompt for code checking to an ML chatbot (or voice bot) to cause an ML model to inspect the source code for security vulnerabilities using test cases for the security vulnerabilities; (2) determine whether there may be a security vulnerability in the source code based on a response from the ML chatbot (or voice bot); and/or (3) responsive to determining that there may be a security vulnerability in the source code, communicate the security vulnerability to a user associated with the source code. The computer system may include additional, less, or alternate functionality, including that discussed elsewhere herein.

In another aspect, a non-transitory computer-readable medium storing processor-executable instructions that, when executed by one or more processors, cause the one or more processors to: (1) send source code and a prompt for code checking to an ML chatbot (or voice bot) to cause an ML model to inspect the source code for security vulnerabilities using test cases for the security vulnerabilities; (2) determine whether there may be a security vulnerability in the source code based on a response from the ML chatbot (or voice bot); and/or (3) responsive to determining that there may be a security vulnerability in the source code, communicate the security vulnerability to a user associated with the source code. The instructions may direct additional, less, or alternate functionality, including that discussed elsewhere herein.

In another aspect, a computer-implemented method for inspecting source code for security vulnerabilities using artificial intelligence (AI) may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) sending, by one or more processors, source code and a prompt for code checking to an AI chatbot (or voice bot) to cause an ML model to inspect the source code for security vulnerabilities using test cases for the security vulnerabilities; (2) determining, by the one or more processors, whether there may be a security vulnerability in the source code based on a response from the AI chatbot (or voice bot); and/or (3) responsive to determining that there may be a security vulnerability in the source code, communicating, by the one or more processors, the security vulnerability to a user associated with the source code. The method may include additional, less, or alternate functionality or actions, including those discussed elsewhere herein.

In another aspect, a computer system for inspecting source code for security vulnerabilities using AI may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer system may include one or more processors configured to: (1) send source code and a prompt for code checking to an AI chatbot (or voice bot) to cause an ML model to inspect the source code for security vulnerabilities using test cases for the security vulnerabilities; (2) determine whether there may be a security vulnerability in the source code based on a response from the AI chatbot (or voice bot); and/or (3) responsive to determining that there may be a security vulnerability in the source code, communicate the security vulnerability to a user associated with the source code. The computer system may include additional, less, or alternate functionality, including that discussed elsewhere herein.

In another aspect, a non-transitory computer-readable medium storing processor-executable instructions that, when executed by one or more processors, cause the one or more processors to: (1) send source code and a prompt for code checking to an ML chatbot (or voice bot) to cause an ML model to inspect the source code for security vulnerabilities using test cases for the security vulnerabilities; (2) determine whether there may be a security vulnerability in the source code based on a response from the ML chatbot (or voice bot); and/or (3) responsive to determining that there may be a security vulnerability in the source code, communicate the security vulnerability to a user associated with the source code. The instructions may direct additional, less, or alternate functionality, including that discussed elsewhere herein.

In addition, the AI or ML chatbot-based systems and methods include improvements in computer functionality or improvements to other technologies at least because the disclosed ML models improve computer security by scanning source code for security vulnerabilities by using test cases for the security vulnerabilities. That is, security may be improved by using ML models to inspect source code for vulnerabilities instead of conventional human inspections. Security may be further improved by an ML models collecting data from prior source code inspections to adapt to the user-specific code base. Additionally, the ML models may automatically generate and execute test cases to improve automation of source code inspections. As such, the ML models may learn and improve their inspection capabilities over time. The ML models may further improve security by identifying fixes for the detected vulnerabilities and generating corrected source code that comprises the fixes. By adapting to the user-specific code base, chatbot-generated corrected source code may contain fewer mistakes, be hardened against a wider range of potential vulnerabilities, and/or may be generated more quickly than human-generated source code.

In addition, the present disclosure includes specific features other than what is well-understood, routine, conventional activity in the field, or adding unconventional steps that confine the claim to a particular useful application, e.g., AI or ML chatbot and ML model-based systems and methods for source code security vulnerability identification and/or remediation, as further described herein.

Additional, alternate and/or fewer actions, steps, features and/or functionality may be included in one aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, methods and systems for security and privacy inspection and enforcement using machine learning (ML) and/or artificial intelligence (AI).

Some embodiments may include one or more of: (1) source code vulnerability inspection and remediation, (2) network security scanning. (3) abnormal network traffic detection, and (4) privacy inspection and enforcement.

Exemplary Computing Environment

Figure 1:
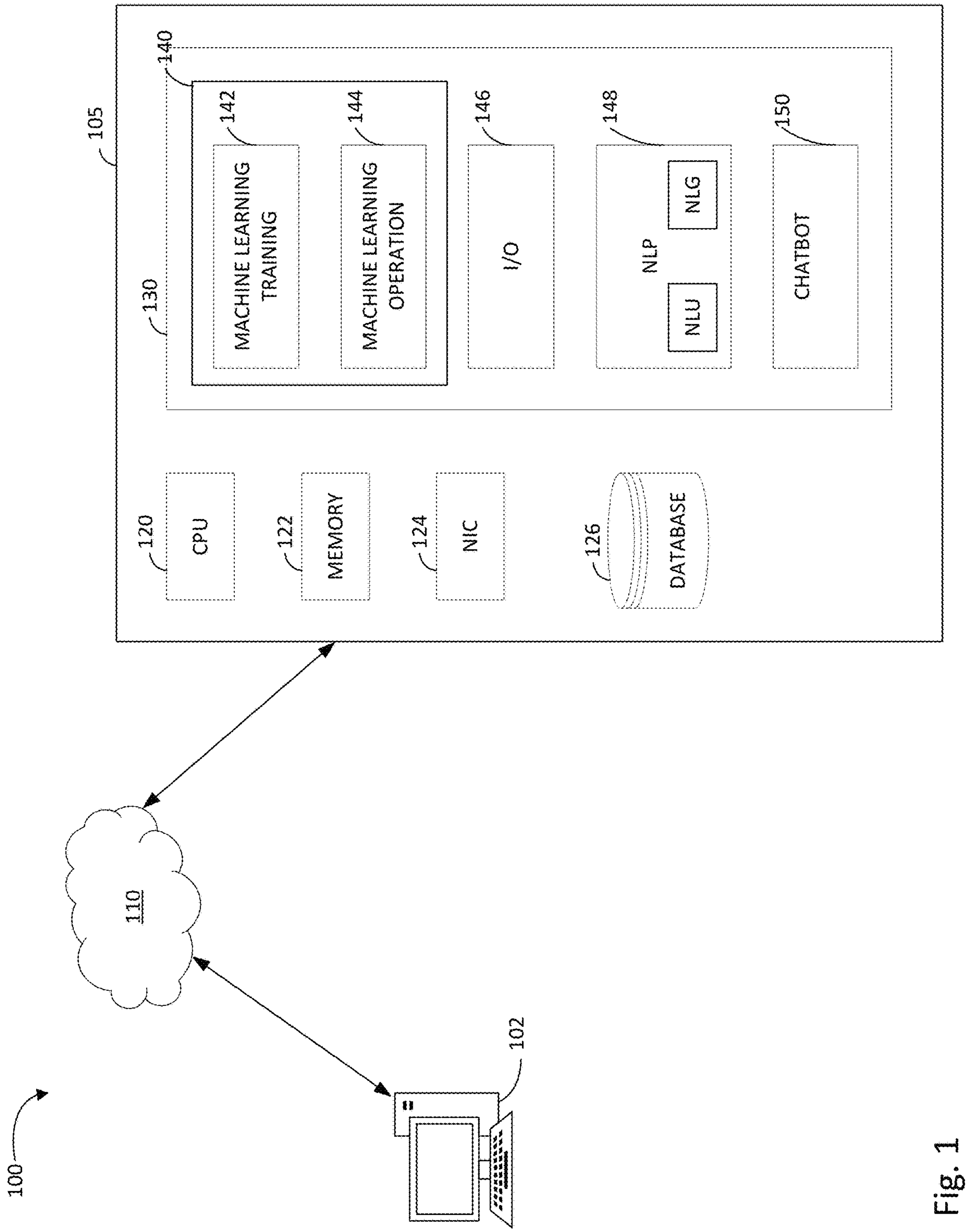
FIG. 1 depicts a block diagram of an exemplary computer system in which methods and systems for security and privacy inspection and enforcement are implemented.

FIG. 1 depicts an exemplary computing environment 100 in which methods and systems for security and privacy inspection and enforcement may be performed, in accordance with various aspects discussed herein.

As illustrated, the computing environment 100 includes a client device 102. The computing environment 100 may further include an electronic network 110 communicatively coupling other aspects of the computing environment 100.

The client device 102 may be any suitable device and include one or more desktop computers, laptop computers, server computers, mobile devices, wearables, smart watches, smart contact lenses, smart glasses, AR glasses/headsets, virtual reality (VR) glasses/headsets, mixed or extended reality glasses/headsets, voice bots or chatbots, ChatGPT bots, displays, display screens, visuals, and/or other electronic or electrical component. The client device 102 may include a memory and a processor for, respectively, storing and executing one or more modules. The memory may include one or more suitable storage media such as a magnetic storage device, a solid-state drive, random access memory (RAM), etc. The client device 102 may access services or other components of the computing environment 100 via the network 110.

As described herein and in one aspect, one or more servers 105 may perform the functionalities as part of a cloud network or may otherwise communicate with other hardware or software components within one or more cloud computing environments to send, retrieve, or otherwise analyze data or information described herein. For example, in certain aspects of the present techniques, the computing environment 100 may include an on-premise computing environment, a multi-cloud computing environment, a public cloud computing environment, a private cloud computing environment, and/or a hybrid cloud computing environment. For example, an entity (e.g., a business) may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by an entity. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 4G, 5G, 6G, etc.). Generally, the network 110 enables bidirectional communication between the client device 102 and the servers 105. In one aspect, the network 110 may comprise a cellular base station, such as cell tower(s), communicating to the one or more components of the computing environment 100 via wired/wireless communications based on any one or more of various mobile phone standards, including NMT, GSM, CDMA, UMTS, LTE, 5G, 6G, or the like. Additionally or alternatively, the network 110 may comprise one or more routers, wireless switches, or other such wireless connection points communicating to the components of the computing environment 100 via wireless communications based on any one or more of various wireless standards, including by non-limiting example, IEEE 802.11a/b/g/n/ac/ax/be (WiFi), Bluetooth, and/or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine-readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX. MacOS, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang. Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML/AI models, chatbots 150, and/or voice bots.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms may be directed toward at least one of a plurality of categorizations of ML, such as supervised learning, unsupervised learning, and reinforcement learning. In one aspect, the ML based algorithms may be included as a library or package executed on server(s) 105. For example, libraries may include the TensorFlow based library, the PyTorch library, the HuggingFace library, and/or the scikit-learn Python library.

In one embodiment, the ML module 140 employs supervised learning, which involves identifying patterns in existing data to make predictions about subsequently received data. Specifically, the ML module may be "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprise a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as computer network 110 and/or the client device 102 (for rendering or visualizing) described herein. In one aspect, servers 105 may include a client-server platform technology such as ASP-.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. I/O module 146 may facilitate I/O components (e.g., ports, capacitive or resistive touch sensitive input panels, keys, buttons, lights, LEDs), which may be directly accessible via, or attached to, servers 105 or may be indirectly accessible via or attached to the client device 102. According to one aspect, an administrator or operator may access the servers 105 via the client device 102 to review information, make changes, input training data, initiate training via the MLTM 142, and/or perform other functions (e.g., operation of one or more trained models via the MLOM 144).

In one aspect, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module 148 may include an NLU to understand the intended meaning of utterances and/or prompts, among other things. The NLP module 148 may include an NLG, which may provide text summarization, machine translation, and dialog where structured data may be transformed into natural conversational language (i.e., unstructured) for output to the user.

In one aspect, the computing modules 130 may include one or more chatbots and/or voice bots 150 which may be programmed to simulate human conversation, interact with users, understand their needs, generate content (e.g., a customized presentation), and/or recommend an appropriate line of action with minimal and/or no human intervention, among other things. This may include providing the best response of any query that it receives and/or asking follow-up questions.

In some embodiments, the voice bots or chatbots 150 discussed herein may be configured to utilize AI and/or ML techniques. For instance, the voice bot or chatbot 150 may be a ChatGPT chatbot. The voice bot or chatbot 150 may employ supervised or unsupervised machine learning techniques, which may be followed by, or used in conjunction with, reinforced or reinforcement learning techniques. The voice bot or chatbot 150 may employ the techniques utilized for ChatGPT. The voice bot or chatbot may deliver various types of output for user consumption in certain embodiments, such as verbal or audible output, a dialogue output, text or textual output (such as presented on a computer or mobile device screen or display), visual or graphical output, and/or other types of outputs.

Noted above, in some embodiments, a chatbot 150 or other computing device may be configured to implement ML, such that the server 105 "learns" to analyze, organize, and/or process data without being explicitly programmed. ML may be implemented through ML methods and algorithms. In one exemplary embodiment, the ML module 140 may be configured to implement the chatbot 150.

For example, in one aspect, the server 105 may initiate a chatbot session over the network 110 with a user via a client device 102, e.g., to provide help to the user of the client device 120. The chatbot 150 may receive utterances and/or prompts from the user, i.e., the input from the user from which the chatbot 150 needs to derive intents from. The utterances and/or prompts may be processed using NLP module 148 and/or ML module 140 via one or more ML models to recognize what the user says, understand the meaning, determine the appropriate action, and/or respond with language (e.g., via text, audio, video, multimedia, etc.) the user can understand.

In one aspect, the server 105 may host and/or provide an application (e.g., a client/application), and/or a website configured to provide the application, to receive source code and/or privacy policy data from a user via client device 120. In one aspect, the server 105 may store code in memory 122 which, when executed by CPU 120, may provide the website and/or application. In some embodiments, the source code and/or privacy policy data may indicate a repository, file location, and/or other data store at which the source code and/or privacy policy may be maintained. In some embodiments, the server 105 may store at least a portion of the indicated source code and/or privacy policy data in the database 126. The data stored in the database 126 may be cleaned, labeled, vectorized, weighted and/or otherwise processed, especially processing suitable for data used in any aspect of ML.

In a further aspect, when the server 105 receives source code and/or privacy policy data and/or generates network security vulnerability testing code, abnormal network traffic detection code, and/or privacy enforcement code, the code and/or data may be stored in the database 126. In one aspect, the server 105 may use the stored data to generate, train and/or retrain one or more ML models and/or chatbots 150, and/or for any other suitable purpose.

In operation, ML model training module 142 may access database 126 or any other data source for training data suitable to generate one or more ML models to generate the network security vulnerability testing code, abnormal network traffic detection code, and/or privacy enforcement code, e.g., an ML module 140. The training data may be sample data with assigned relevant and comprehensive labels (classes or tags) used to fit the parameters (weights) of an ML model with the goal of training it by example. In one aspect, training data may include documents describing a security vulnerability, example source code lacking a security vulnerability, and/or example source code lacking a security vulnerability. In another aspect, training data may include a set of security vulnerability announcements and/or a set of network security vulnerability testing code. In another aspect, training data may include a set of normal network traffic and/or a set of abnormal network traffic. In another aspect, training data may include a set of privacy laws and/or regulations, a set of privacy policy examples, and a set of private information examples. In one aspect, once an appropriate ML model is trained and validated to provide accurate predictions and/or responses, e.g., the ML module 140, the trained model and/or chatbot 150 may be loaded into MLOM 144 at runtime, may process the user inputs, utterances and/or prompts, and may generate as an output conversational dialog and/or a customized presentation.

In one aspect, the chatbot 150 (e.g., an ML or AI chatbot) may include one or more ML models trained to generate one or more types of content for a customized communication, such as text component, audio component, images/video, slides, virtual reality, augmented reality, mixed reality component, multimedia, blockchain and/or metaverse content, as well as any other suitable content.

While various embodiments, examples, and/or aspects disclosed herein may include training and generating one or more ML models and/or chatbot 150 for the server 105 to load at runtime, it is also contemplated that one or more appropriately trained ML models and/or chatbot 150 may already exist (e.g., in database 126) such that the server 105 may load an existing trained ML model and/or chatbot 150 at runtime. It is further contemplated that the server 105 may retrain, update and/or otherwise alter an existing ML model and/or chatbot 150 before loading the model at runtime.

Although the computing environment 100 is shown to include one client device 102, one server 105, and one network 110, it should be understood that different numbers of client devices 102, networks 110, and/or servers 105 may be utilized. In one example, the computing environment 100 may include a plurality of servers 105 and hundreds or thousands of client devices 102, all of which may be interconnected via the network 110. Furthermore, the database storage or processing performed by the one or more servers 105 may be distributed among a plurality of servers 105 in an arrangement known as "cloud computing." This configuration may provide various advantages, such as enabling near real-time uploads and downloads of information as well as periodic uploads and downloads of information.

The computing environment 100 may include additional, fewer, and/or alternate components, and may be configured to perform additional, fewer, or alternate actions, including components/actions described herein. Although the computing environment 100 is shown in FIG. 1 as including one instance of various components such as client device 102, server 105, and network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 105 and client device 102 may be connected via a direct communication link (not shown in FIG. 1) instead of, or in addition to, via network 130.

Exemplary Training of the ML Chatbot Model

An enterprise may be able to use programmable chatbots, such chatbot 150 (e.g., ChatGPT), to provide source code vulnerability inspection and remediation, network security scanning, abnormal network traffic detection, and/or privacy inspection and enforcement for unstructured data. In one aspect, the chatbot may be capable of receiving source code and receiving and understanding prompts for code checking. In another aspect, the chatbot may be capable of receiving and understanding prompts for network security vulnerability testing code. In another aspect, the chatbot may be capable of receiving and understanding prompts for abnormal network traffic detection code. In another aspect, the chatbot may be capable of receiving and understanding privacy policies and prompts for privacy enforcement code.

The ML chatbot may include and/or derive functionality from a Large Language Model (LLM). The ML chatbot may be trained on a server, such as server 105, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O module, such as the I/O module 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances and/or prompts, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 105) that may be required for immediate use and may keep track of the current state of the conversation and/or to understand the user's latest input in order to generate an appropriate response. Long-term memory may include persistent storage of information (e.g., on database 126 of the server 105) which may be accessed over an extended period of time. The ML chatbot may use the long-term memory to store information about the user (e.g., preferences, chat history, etc.) which may improve an overall user experience by enabling the ML chatbot to personalize and/or provide more informed responses.

The system and methods to generate and/or train an ML chatbot model (e.g., via the ML module 140 of the server 105) which may be used by an ML chatbot, may consist of three steps: (1) a Supervised Fine-Tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT (Supervised Fine-Tuning) ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data may be collected on the current ML chatbot model, which may be used to optimize/update the reward model and/or further optimize/update the policy.

Supervised Fine-Tuning (SFT) ML Model

Figure 2:
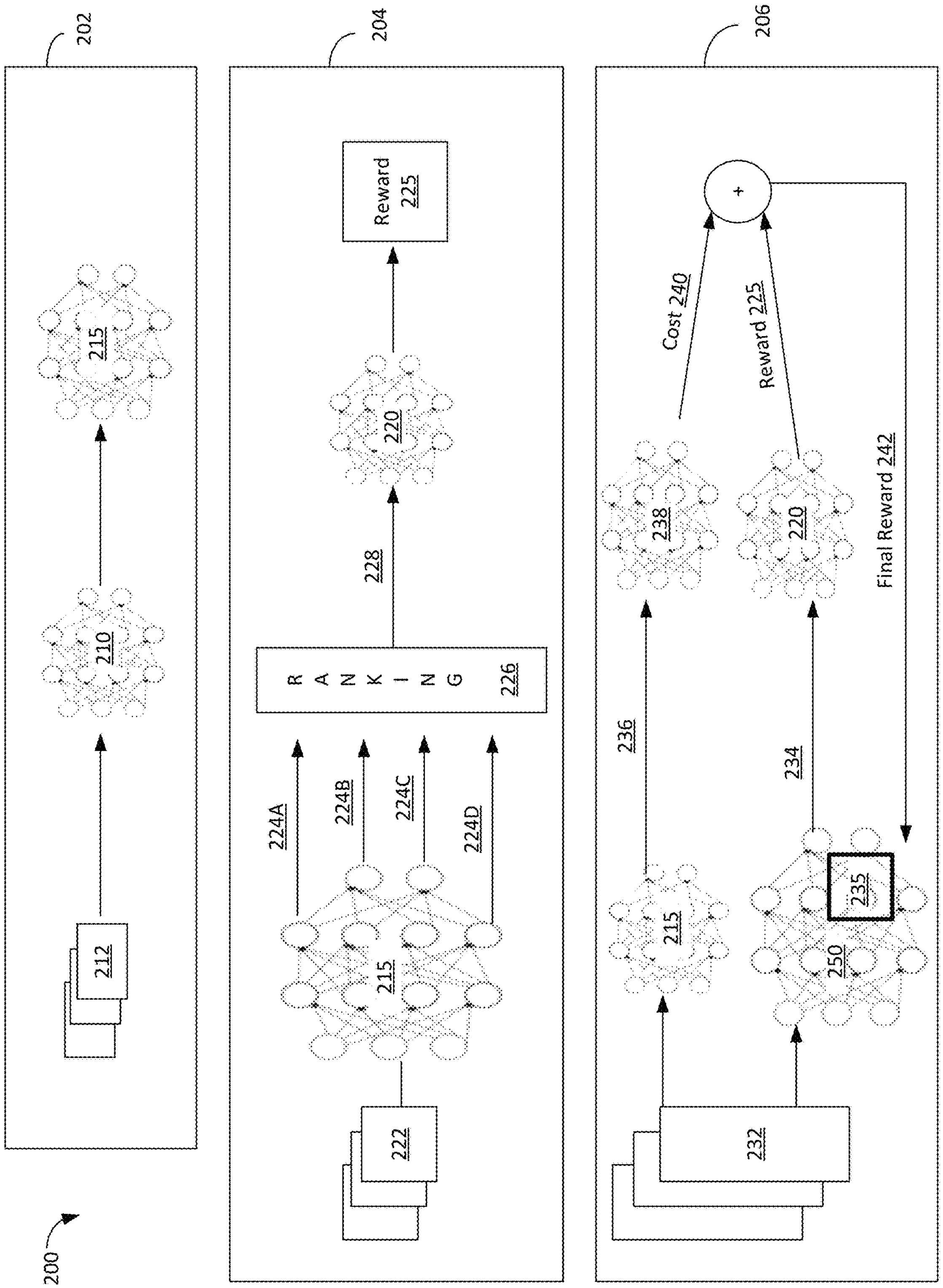
FIG. 2 depicts a combined block and logic diagram for exemplary training of an ML chatbot.

FIG. 2 depicts a combined block and logic diagram 200 for exemplary training of an ML chatbot model, in which the techniques described herein may be implemented, according to some embodiments. Some of the blocks in FIG. 2 may represent hardware and/or software components, other blocks may represent data structures or memory storing these data structures, registers, or state variables (e.g., 212), and other blocks may represent output data (e.g., 225). Input and/or output signals may be represented by arrows labeled with corresponding signal names and/or other identifiers. The methods and systems may include one or more servers 202, 204, 206, such as the server 105 of FIG. 1.

In one aspect, the server 202 may fine-tune a pretrained language model 210. The pretrained language model 210 may be obtained by the server 202 and be stored in a memory, such as the server memory 122 and/or the database 126. The pretrained language model 210 may be loaded into an ML training module, such as MLTM 142, by the server 202 for retraining/fine-tuning. A supervised training dataset 212 may be used to fine-tune the pretrained language model 210 wherein each data input prompt to the pretrained language model 210 may have a known output response for the training the pretrained language model 210. The supervised training dataset 212 may be stored in a memory of the server 202, e.g., the memory 122 and/or the database 126. In one aspect, the data labelers may create the supervised training dataset 212 prompts and appropriate responses. The pretrained language model 210 may be fine-tuned using the supervised training dataset 212, resulting in the SFT ML model 215 which may provide appropriate responses to user prompts once trained. The trained SFT ML model 215 may be stored in a memory of the server 202, e.g., memory 122 and/or database 126.

In one aspect, the supervised training dataset 212 may include prompts and responses which may be relevant to security and privacy inspection and enforcement. For example, user prompts may include requests for inspecting source code for security vulnerabilities and generating network security vulnerability testing code, abnormal network traffic detection code, and privacy enforcement code. Appropriate responses from the trained SFT ML model 215 may include output of detected security vulnerabilities and source code for network security vulnerability testing, abnormal network traffic detection, and privacy enforcement, among other things.

Training the Reward Model

In one aspect, training the ML chatbot model 250 may include the server 204 training a reward model 220 to provide as an output a scaler value/reward 225. The reward model 220 may be required to leverage Reinforcement Learning with Human Feedback (RLHF) in which a model (e.g., ML chatbot model 250) learns to produce outputs which maximize its reward 225, and in doing so may provide responses which may be better aligned to user prompts.

Training the reward model 220 may include the server 204 providing a single prompt 222 to the SFT ML model 215 as an input. The input prompt 222 may be provided via an input device (e.g., a keyboard) via the I/O module of the server, such as I/O module 146. The prompt 222 may be previously unknown to the SFT ML model 215, e.g., the labelers may generate new prompt data, the prompt 222 may include testing data stored on database 126, and/or any other suitable prompt data. The SFT ML model 215 may generate multiple, different output responses 224A, 224B, 224C, 224D to the single prompt 222. The server 204 may output the responses 224A, 224B, 224C, 224D via an I/O module (e.g., I/O module 146) to a user interface device, such as a display (e.g., as text responses), a speaker (e.g., as audio/voice responses), and/or any other suitable manner of output of the responses 224A, 224B, 224C, 224D for review by the data labelers.

The data labelers may provide feedback via the server 204 on the responses 224A. 224B. 224C. 224D when ranking 226 them from best to worst based upon the prompt-response pairs. The data labelers may rank 226 the responses 224A, 224B, 224C, 224D by labeling the associated data. The ranked prompt-response pairs 228 may be used to train the reward model 220. In one aspect, the server 204 may load the reward model 220 via the ML module (e.g., the ML module 140) and train the reward model 220 using the ranked response pairs 228 the input. The reward model 220 may provide as the output the scalar reward 225.

In one aspect, the scalar reward 225 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 220 may generate a winning reward. Inputting a "losing" prompt-response pair data to the same reward model 220 may generate a losing reward. The reward model 220 and/or scalar reward 236 may be updated based upon labelers ranking 226 additional prompt-response pairs generated in response to additional prompts 222.

In one example, a data labeler may provide to the SFT ML model 215 as an input prompt 222, "Describe the sky." The input may be provided by the labeler via the client device 102 over network 110 to the server 204 running a chatbot application utilizing the SFT ML model 215. The SFT ML model 215 may provide as output responses to the labeler via the client device 102: (i) "the sky is above" 224A; (ii) "the sky includes the atmosphere and may be considered a place between the ground and outer space" 224B; and (iii) "the sky is heavenly" 224C. The data labeler may rank 226, via labeling the prompt-response pairs, prompt-response pair 222/224B as the most preferred answer; prompt-response pair 222/224A as a less preferred answer; and prompt-response 222/224C as the least preferred answer. The labeler may rank 226 the prompt-response pair data in any suitable manner. The ranked prompt-response pairs 228 may be provided to the reward model 220 to generate the scalar reward 225.

While the reward model 220 may provide the scalar reward 225 as an output, the reward model 220 may not generate the response (e.g., text). Rather, the scalar reward 225 may be used by a version of the SFT ML model 215 to generate more accurate responses to prompts, i.e., the SFT model 215 may generate the response such as text to the prompt, and the reward model 220 may receive the response to generate a scalar reward 225 of how well humans perceive it. Reinforcement learning may optimize the SFT model 215 with respect to the reward model 220 which may realize the configured ML chatbot model 250.

Reinforcement Learning with Human Feedback to Train the ML Chatbot Model

In one aspect, the server 206 may train the ML chatbot model 250 (e.g., via the ML module 140) to generate a response 234 to a random, new and/or previously unknown user prompt 232. To generate the response 234, the ML chatbot model 250 may use a policy 235 (e.g., algorithm) which it learns during training of the reward model 220, and in doing so may transition and/or evolve from the SFT model 215 to the ML chatbot model 250. The policy 235 may represent a strategy that the ML chatbot model 250 may learn to maximize its reward 225. As discussed herein, based upon prompt-response pairs, a human labeler may continuously provide feedback to assist in determining how well the ML chatbot's 250 responses match expected responses to determine rewards 225. The rewards 225 may feed back into the ML chatbot model 250 to evolve the policy 235. Thus, the policy 235 may adjust the parameters of the ML chatbot model 250 based upon the rewards 225 it receives for generating preferred responses. The policy 235 may update as the ML chatbot model 250 provides responses 234 to additional prompts 232.

In one aspect, the response 234 of the ML chatbot model 250 using the policy 235 based upon the reward 225 may be compared using a cost function 238 to the SFT ML model 215 (which may not use a policy) response 236 of the same prompt 232. The server 206 may compute a cost 240 based upon the cost function 238 of the responses 234, 236. The cost 240 may reduce the distance between the responses 234, 236, i.e., a statistical distance measuring how one probability distribution is different from a second, in one aspect the response 234 of the ML chatbot model 250 versus the response 236 of the SFT model 215. Using the cost 240 to reduce the distance between the responses 234, 236 may avoid the server (e.g., server 206) over-optimizing the reward model 220 and deviating too drastically from the human-intended/preferred response. Without the cost 240, the ML chatbot model 250 optimizations may result in generating responses 234 which may be unreasonable but may still result in the reward model 220 outputting a high reward 225.

In one aspect, the responses 234 of the ML chatbot model 250 using the current policy 235 may be passed by the server 206 to the rewards model 220, which may return the scalar reward 225. The ML chatbot model 250 response 234 may be compared via cost function 238 to the SFT ML model 215 response 236 by the server 206 to compute the cost 240. The server 206 may generate a final reward 242 which may include the scalar reward 225 offset and/or restricted by the cost 240. The final reward 242 may be provided by the server 206 to the ML chatbot model 250 and may update the policy 235, which in turn may improve the functionality of the ML chatbot model 250.

To optimize the ML chatbot 250 over time, RLHF (via the human labeler feedback) may continue ranking 226 responses of the ML chatbot model 250 versus outputs of earlier/other versions of the SFT ML model 215, i.e., providing positive or negative rewards or adjustment 225. The RLHF may allow the servers (e.g., servers 204, 206) to continue iteratively updating the reward model 220 and/or the policy 235. As a result, the ML chatbot model 250 may be retrained and/or fine-tuned based upon the human feedback via the RLHF process, and throughout continuing conversations may become increasingly efficient.

Although multiple servers 202, 204, 206 are depicted in the exemplary block and logic diagram 200, each providing one of the three steps of the overall ML chatbot model 250 training, fewer and/or additional servers may be utilized and/or may provide the one or more steps of the ML chatbot model 250 training. In one aspect, one server may provide the entire ML chatbot model 250 training.

Exemplary ML Model to Inspect Source Code for Security Vulnerabilities

In one embodiment, detecting security vulnerabilities in source code may use ML. The source code may include precompiled application source code for an application.

Figure 3:
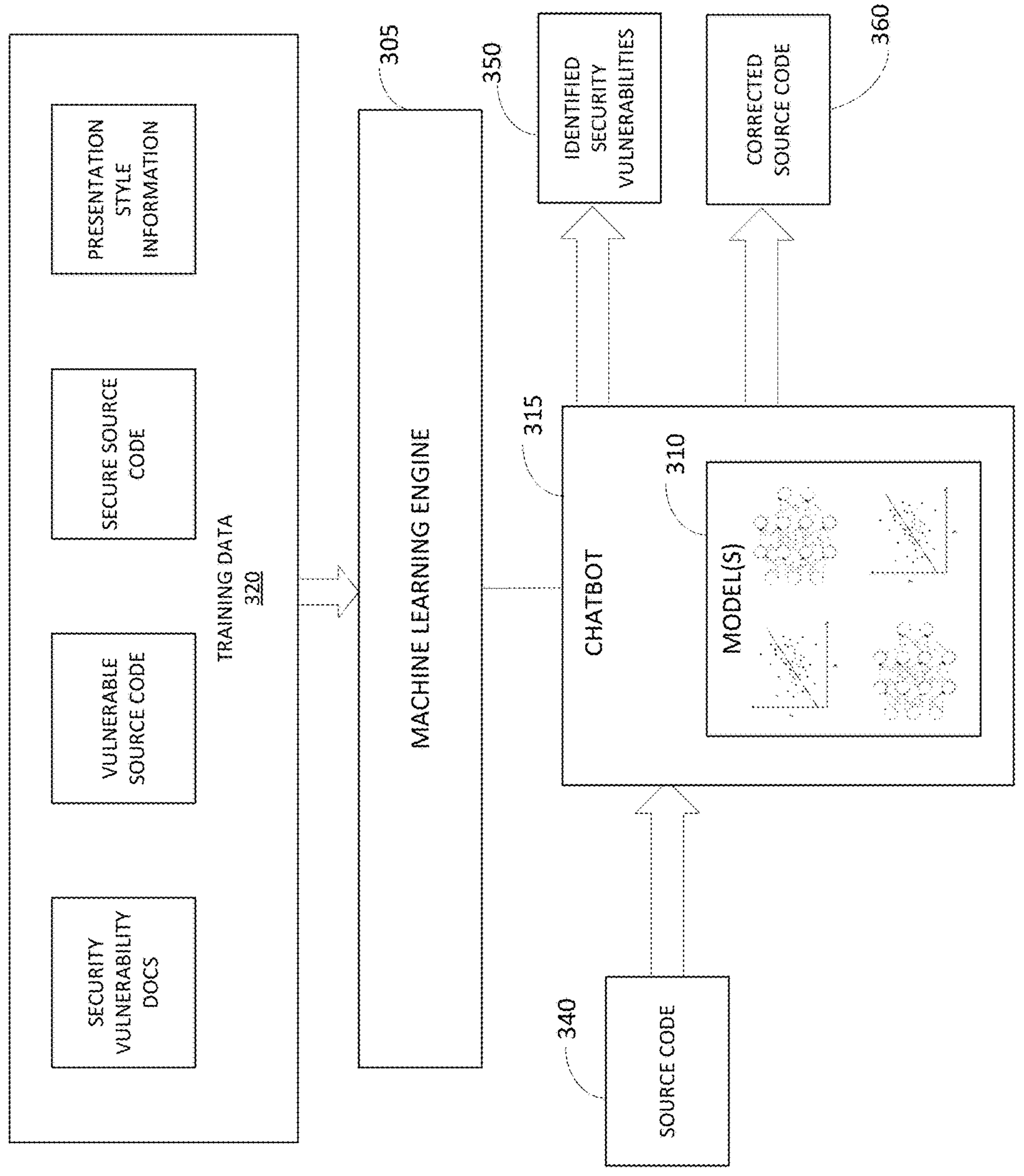
FIG. 3 depicts a combined block and logic diagram of an exemplary server generating a list of security vulnerabilities and corrected source code using generative AI/ML.

FIG. 3A schematically illustrates how an ML model may identify security vulnerabilities in source code. Some of the blocks in FIG. 3A represent hardware and/or software components (e.g., block 305), other blocks represent data structures or memory storing these data structures, registers, or state variables (e.g., blocks 320), and other blocks represent output data (e.g., block 350). Input and output signals are represented by arrows.

An ML engine 305 may include one or more hardware and/or software components, such as the MLTM 142 and/or the MLOM 144, to obtain, create, (re)train, operate and/or save one or more ML models 310. To generate an ML model 310, the ML engine 305 may use training data 320.

As described herein, the server such as server 105 may obtain and/or have available various types of training data 320 (e.g., stored on database 126 of server 105). In an aspect, the training data 320 may labeled to aid in training, retraining and/or fine-tuning the ML model 310. The training data 320 may include security vulnerability documents. The security vulnerability documents may comprise descriptions of security vulnerabilities in source code, applications, or software. For example, security vulnerability documents may be in Common Weakness Enumeration format, Common Vulnerability Exposures format, or unformatted. The security vulnerabilities in the security vulnerability documents may include out-of-bounds read and write of buffers or stacks, improper restriction of operations within the bounds of a memory buffer, cross-site scripting, SQL injection, LDAP injection, command injection, code injection, improper input validation, use after free, path traversal, cross-site request forgery, unrestricted upload of files with a dangerous type, NULL pointer dereference, deserialization of untrusted data, integer overflow or wraparound, improper authentication, hard-coded credentials, missing authorization, missing authentication for critical function, incorrect default permissions, server-side request forgery, race conditions, uncontrolled resource consumption, and improper restriction of XML external entity reference. New security vulnerability documents describing recently announced security vulnerabilities may be used to retrain or update the ML model 310.

The training data 320 may also include examples of vulnerable source code. For example, the vulnerable source code may include source code comprising one or more security vulnerabilities. The vulnerable source code may be written in the C, C++, C#, Visual Basic, Python, Java, JavaScript, or other programming languages. An ML model may process this type of training data 320 to derive associations between the security vulnerability documents and vulnerable source code examples. For example, the security vulnerability documents may describe SQL injection and the danger of SQL syntax in user-generated inputs. Based upon the security vulnerability documents and examples of source code vulnerable to SQL injection, the ML model 310 may generate test cases for determining susceptibility to SQL injection.

The training data 320 may also include examples of secure source code. The secure source code may include source code lacking any security vulnerabilities. For example, the secure source code may include source code performing functions such as user authentication, user input validation, database reads, database writes, pointer referencing and dereferencing, etc. An ML model may process this type of training data 320 to derive associations between the security vulnerability documents, vulnerable source code examples, and secure source code examples. For example, based upon the security vulnerability documents, vulnerable source code, and secure source code, the ML model 310 may refine its security vulnerability pattern detection. The ML model 310 may also output corrected source code 360 based upon the secure source code.

While the example training data includes indications of various types of training data 320, this is merely an example for ease of illustration only. The training data 320 may include any suitable data that may indicate associations between security vulnerabilities and source code, as well as any other suitable data which may train the ML model 310 to generate the identified security vulnerabilities 350 and/or the corrected source code 360. The ML model 310 trained on such training data 320 will have an improved capability to generate the identified security vulnerabilities 350 and/or the corrected source code 360 when compared to a conventional ML chatbot.

In an aspect, the server may continuously update the training data 320, e.g., based upon obtaining additional security vulnerability documents, feedback or data collected from prior source code inspections, or any other training data. Subsequently, the ML model 310 may be retrained/fine-tuned based upon the updated training data 320. Accordingly, the identification of security vulnerabilities and/or the generation of corrected source code may improve over time.

In an aspect, the ML engine 305 may process and/or analyze the training data 320 (e.g., via MLTM 142) to train the ML model 310 to generate the identified security vulnerabilities 350. The ML model 310 may be trained to generate the identified security vulnerabilities 350 via a large language model, neural network, deep learning model, Transformer-based model, generative pretrained transformer (GPT), generative adversarial network (GAN), regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

In an aspect, the ML engine 305 may process and/or analyze the training data 320 (e.g., via MLTM 142) to train the ML model 310 to generate fixes for security vulnerabilities. The fixes may comprise a secure source code segment. The fixes may be included in the identified security vulnerabilities 350 or may be communicated separately to the user. The ML engine 305 may use the fixes in generating the corrected source code 360. The ML engine 305 may replace a vulnerable source code segment with a fix to generate the corrected source code 360.

Once trained, the ML model 310 may perform operations on one or more data inputs to produce a desired data output. In one aspect, the ML model 310 may be loaded at runtime (e.g., by the MLOM 144) from a database (e.g., the database 126 of the server 105) to process source code 340 data input. The server, such as server 105, may obtain the source code 340 and use it as an input to generate the identified security vulnerabilities 350 and/or the corrected source code 360. In one aspect, the server may obtain the source code 340 via the client device 102 (e.g., of the application developer or owner) via a website, the chatbot 150, or any other suitable user device. The source code 340 may include one or more one or more functions, classes, libraries, stored procedures, scripts, or source code files.

In one aspect, the ML model 310 may weigh one or more attributes of the source code 340 such that they may be of unequal importance. For example, the source code 340 may contain a race condition vulnerability and a buffer overflow vulnerability. The race condition may cause the application to become unavailable, while the buffer overflow may allow an attacker to execute commands with administrator privileges. Or the race condition may be difficult or unlikely to be exploited, while the buffer overflow vulnerability may be a common exploit. Thus, the ML model 310 may apply an increased severity score to the buffer overflow vulnerability versus the race condition vulnerability.

In one embodiment, the ML model 310 may use a regression model to determine a severity score associated with an identified security vulnerability based upon the security vulnerability documents, which may be a preferred model in situations involving scoring output data. In one aspect, the ML model 310 may rank the identified security vulnerabilities 350 based upon the severity scores.

Once the identified security vulnerabilities 350 and/or the corrected source code 360 are generated by the ML model 310, they may be provided to the client device 102 or to another user device. For example, the server 105 may provide the identified security vulnerabilities 350 and/or the corrected source code 360 via a mobile app to mobile device, in an email, a website, via a chatbot (such as the chatbot 315), and/or in any other suitable manner. The client device 102 may cause existing source code in a project or existing application to be replaced with the corrected source code 360. The client device 102 may cause the corrected source code 360 to be compiled to generate a new version of the existing application.

Generative AI/ML may enable a computer, such as the server 105, to use existing data (e.g., as an input and/or training data) such as text, audio, video, images, and/or code, among other things, to generate new content, such as an identified security vulnerabilities and/or corrected source code presentation customized for an organization, via one or more models. Generative ML may include unsupervised and semi-supervised ML algorithms, which may automatically discover and learn patterns in input data. Once trained, e.g., via MLTM 142, a generative ML model may generate content as an output which plausibly may have been drawn from the original input dataset and may include the content in the customized presentation. In one aspect, an ML chatbot such as chatbot 150 may include one or more generative AI/ML models.

Some types of generative AI/ML may include GANs and/or transformer-based models. In one aspect, the GAN may generate images, visual and/or multimedia content from image and/or text input data. The GAN may include a generative model (generator) and discriminative model (discriminator). The generative model may produce an image which may be evaluated by the discriminative model and use the evaluation to improve operation of the generative model. The transformer-based model may include a generative pre-trained language model, such as the pre-trained language model used in training ML chatbot model 250 described herein. Other types of generative AI/ML may use the GAN, the transformer model, and/or other types of models and/or algorithms to generate: (i) realistic images from sketches, which may include the sketch and object category as input to output a synthesized image; (ii) images from text, which may produce images (realistic, paintings, etc.) from textual description inputs; (iii) speech from text, which may use character or phoneme input sequences to produce speech/audio outputs; (iv) audio, which may convert audio signals to two-dimensional representations (spectrograms) which may be processed using algorithms to produced audio; and/or (v) video, which may generate and convert video (i.e., a series of images) using image processing techniques and may include predicting what the next frame in the sequence of frames/video may look like and generating the predicted frame. With the appropriate algorithms and/or training, generative AI/ML may produce various types of multimedia output and/or content which may be incorporated into a customized presentation, e.g., via an AI and/or ML chatbot (or voice bot).

In one aspect, an enterprise may use the AI and/or ML chatbot, such as the trained chatbot 150, to generate one or more customized components of the customized presentation to walk a user through the identified security vulnerabilities 350 and/or the corrected source code 360. The trained ML chatbot may generate output such as images, video, slides (e.g., a PowerPoint slide), virtual reality, augmented reality, mixed reality, multimedia, blockchain entries, metaverse content, or any other suitable components which may be used in the customized presentation.

Once trained, the ML chatbot which may include on one more generative AI/ML models such as those described may be able to generate the customized presentation based upon one or more prompts, such as a prompt for code checking. In response, the ML chatbot may generate audio/voice/speech, text, slides, and/or other suitable content which may be included in the customized presentation.

In one aspect, the chatbot 315 may use, access, be operably connected to and/or otherwise include one or more ML models 310 to generate a customized presentation of the identified security vulnerabilities 350. The chatbot 315 may generate the customized presentation in response to receiving the source code 340 as the input.

In one aspect, the training data 320 may include presentation style information such as images, text, phonemes, audio, or other types of data which may be used as inputs as discussed herein for training one or more AI/ML models to generate different types of presentation components. The training data 320 may include style information related to a particular style (e.g., fonts, logos, emblems, colors, etc.) an organization would like the customized presentation components to emulate. The training data 320 may include user profile information which may affect customizing the presentation for a particular user or organization, e.g., the sophistication level of a particular user. The training data 320 may include historical security vulnerabilities, e.g., based upon past identified security vulnerabilities, that may be relevant to include in the customized presentation for a similar type of identified security vulnerability. While the example training data 320 includes indications of various types of data, this is merely an example for case of illustration only. The training data 320 may include any data relevant to generating the customized presentation of the identified security vulnerabilities 350 and/or the corrected source code 360.

In one aspect, the server 105 may obtain the source code 340, e.g., as input from client device 102, as well as any other suitable manner of obtaining source code 340. In one aspect, the user for whom the identified security vulnerabilities 350 and/or corrected source code 360 is being generated provides source code 340 via the chatbot 315, e.g., using a web interface. In one embodiment, the user copies and pastes text from source code 340 into a dialog box of a web interface. In another embodiment, the user uploads one or more files containing source code 340. The source code 340 may be provided as an input to the one or more ML models 310 and/or chatbots 315. The one or more chatbots 315 and/or ML models 310 may employ one or more AI/ML models (e.g., SFT ML model, GAN, pre-trained language models, etc.) and/or algorithms (e.g., supervised learning, unsupervised learning, semi-supervised learning, and/or reinforcement learning) discussed herein to generate the customized presentation of identified security vulnerabilities 350 and/or corrected source code 360. For example, a user may provide source code 340 and request a security vulnerability inspection. One or more ML models 310 and/or chatbots 315 may generate the customized identified security vulnerabilities 350 to use style information such as colors, fonts and/or logos associated with an organization, among other things. The one or more ML models 310 and/or ML chatbots 315 may generate the customized corrected source code to use style information, such as comments and naming preferences, among other things.

The organization may update and save in a memory, such as memory 122 and/or database 126 of server 105, training data 320. ML model 305 may use the updated training data 320 to retrain and/or fine tune the ML model 310 and/or chatbot 315. For example, the organization may create updated organization style information which may affect the look of newly generated customized identified security vulnerabilities 350. Subsequently, one or more ML models 310 may be retrained (e.g., via MLTM 142) based upon updated training data 320.

Exemplary ML Model to Generate Network Security Vulnerability Testing Code

In one embodiment, generating network security vulnerability testing code may use ML. The generated network security vulnerability testing code may be compiled or uncompiled.

Figure 4A:
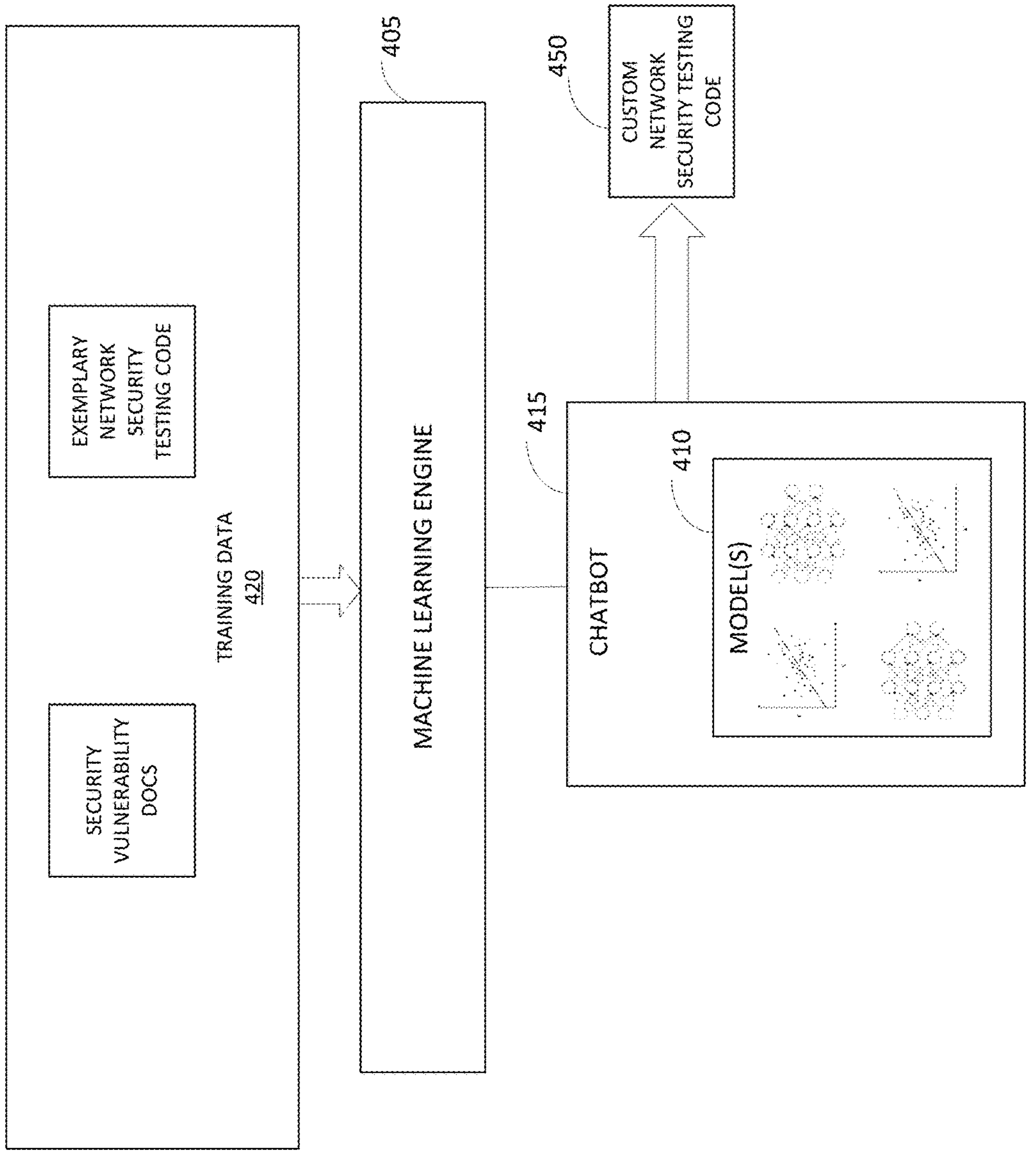
FIG. 4A depicts a combined block and logic diagram of an exemplary server generating network security vulnerability testing code using generative AI/ML.

FIG. 4A schematically illustrates how an ML model may generate custom network security testing code 450. Some of the blocks in FIG. 4A represent hardware and/or software components (e.g., block 405), other blocks represent data structures or memory storing these data structures, registers, or state variables (e.g., blocks 420), and other blocks represent output data (e.g., block 450). Input and output signals are represented by arrows.

The custom network security testing code 450 may comprise source code. The custom network security testing code 450 may be written in the C, C++, C#, Visual Basic, Python, Java, JavaScript, or other programming languages. The custom network security testing code 450 may be a compiled executable that may run on Windows, Linux, Unix, MacOS, or other operating systems. The custom network security testing code 450 may comprise signatures for one or more network security scanning software or hardware tools. The signatures may cause the one or more network security scanning tools to scan for and identify one or more network security vulnerabilities.

An ML engine 405 may include one or more hardware and/or software components, such as the MLTM 142 and/or the MLOM 144, to obtain, create, (re)train, operate and/or save one or more ML models 410. To generate an ML model 410, the ML engine 405 may use training data 420.

As described herein, the server such as server 105 may obtain and/or have available various types of training data 420 (e.g., stored on database 126 of server 105). In an aspect, the training data 420 may labeled to aid in training, retraining and/or fine-tuning the ML model 410. The training data 420 may include security vulnerability documents. The security vulnerability documents may comprise descriptions of security vulnerabilities in networked computing devices. For example, security vulnerability documents may be in Common Weakness Enumeration format, Common Vulnerability Exposures format, or unformatted. The security vulnerabilities in the security vulnerability documents may include Log 4Shell, ProxyShell, ProxyLogon, ZeroLogon, SQL injection, LDAP injection, buffer overflows, stack overflows, cross-site scripting, remote code execution, command execution, elevation of privilege, and denial of service. New security vulnerability documents describing recently announced network security vulnerabilities may be used to retrain or update the ML model 410.

The training data 420 may also include exemplary network security testing code. For example, the network security testing code may include source code that scans and detects one or more network security vulnerabilities. The exemplary network security testing code may be written in the C, C++, C#, Visual Basic, Python, Java, JavaScript, or other programming languages. The exemplary network security testing code may be written in pseudocode. The exemplary network security testing code may comprise signatures for one or more network security scanning tools. An ML model may process this type of training data 420 to derive associations between the security vulnerability documents and exemplary network security testing code. For example, the security vulnerability documents may describe SQL injection and the danger of SQL syntax in user-generated inputs. Based upon the security vulnerability documents and exemplary network security testing code, the ML model 410 may generate custom network security testing code 450 that tests for one or more security vulnerabilities described in the security vulnerability documents.

While the example training data includes indications of various types of training data 420, this is merely an example for case of illustration only. The training data 420 may include any suitable data that may indicate associations between security vulnerabilities and network security testing code, as well as any other suitable data which may train the ML model 410 to generate the custom network security testing code 450.

In an aspect, the server may continuously update the training data 420, e.g., based upon obtaining additional security vulnerability documents, feedback or data collected from network security vulnerability inspections, or any other training data. Subsequently, the ML model 410 may be retrained/fine-tuned based upon the updated training data 420. Accordingly, the generation of the custom network security testing code 450 may improve over time.

In an aspect, the ML engine 405 may process and/or analyze the training data 420 (e.g., via MLTM 142) to train the ML model 410 to generate the custom network security testing code 450. The ML model 410 may be trained to generate the custom network security testing code 450 via a large language model, neural network, deep learning model, Transformer-based model, GPT, GAN, regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

Once the custom network security testing code 450 is generated by ML 410, it may be provided to the client device 102 or to another computing device. For example, the server 105 may provide the custom network security testing code 450 in an email, a website, via a chatbot (such as the chatbot 415), and/or in any other suitable manner. The client device 102 may cause existing network security testing code to be replaced with the custom network security testing code 450.

Figure 4B:
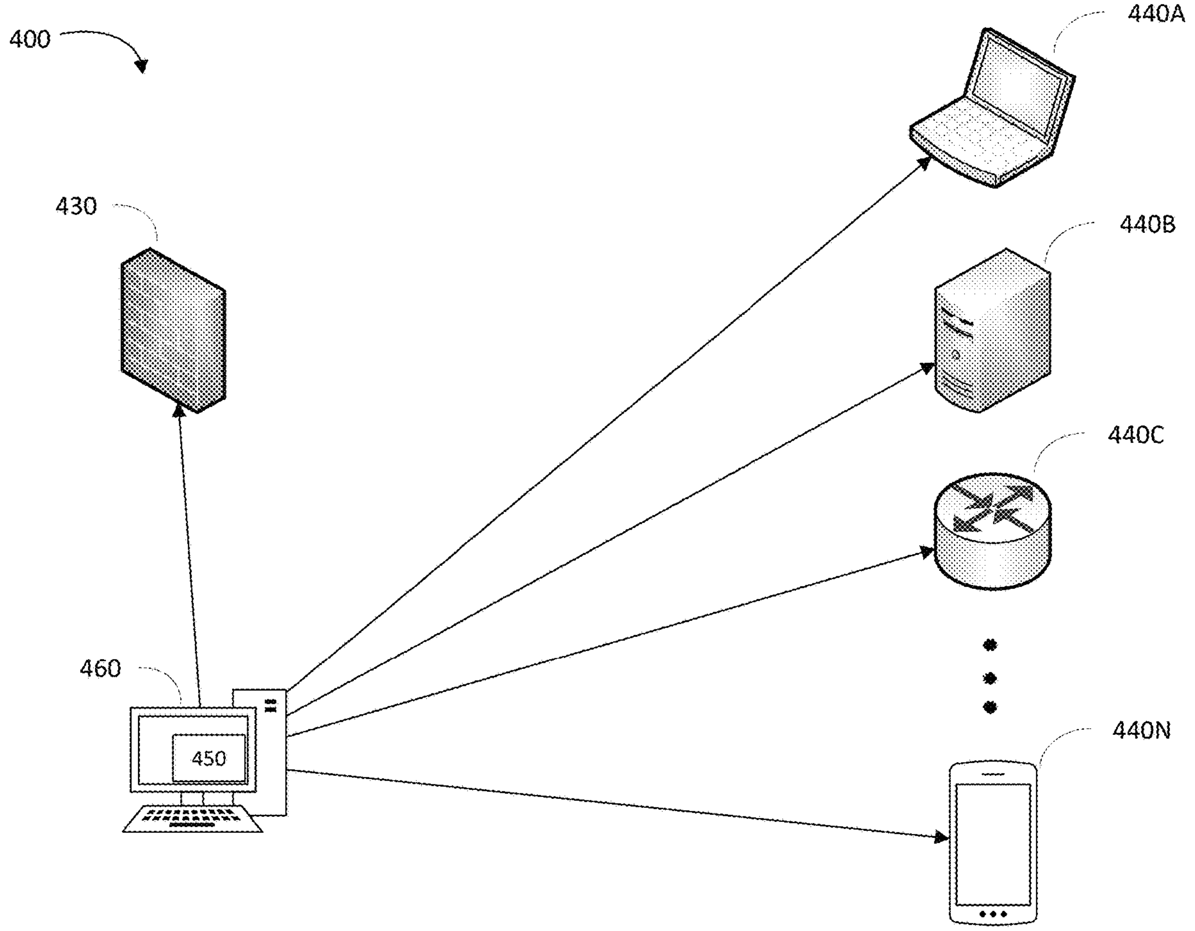
FIG. 4B depicts an exemplary networking environment for network security vulnerability testing.

Exemplary Execution of Network Security Vulnerability Testing Code to Scan for Network Security Vulnerabilities FIG. 4B illustrates an exemplary networking environment 400 in which methods and systems for network security vulnerability inspection may be performed, in accordance with various aspects discussed herein.

A network security scanner 460 may execute the custom network security testing code 450 to identify one or more networked computing devices 440A-N and/or scan the networked computing devices 440A-N for network security vulnerabilities. Network scans and/or communications are represented by arrows.

The network security scanner 460 may be any suitable device and include the client device 102, one or more desktop computers, laptop computers, server computers, voice bots or chatbots 150, ChatGPT bots, and/or other electronic or electrical component. The network security scanner 460 may include a memory and a processor for, respectively, storing and executing one or more modules. The memory may include one or more suitable storage media such as a magnetic storage device, a solid-state drive, random access memory (RAM), etc. The network security scanner 460 may include one or more network interfaces, such as a wired, wireless LAN, cellular, and/or any other suitable network interface. The network security scanner 460 may access services or other components of the networking environment 400 via the network interface.

In one aspect, the network security scanner 460 includes the custom network security testing code 450. The network security scanner 460 may run the executable custom network security testing code 450. The network security scanner 460 may compile the custom network security testing code 450 into an executable. The network security scanner 460 may execute an interpreter to run the custom network security testing code 450. The network security scanner 460 may execute network security scanning software to run the custom network security testing code 450.

In another aspect, the network security scanner 460 receives the custom network security testing code 450 from the chatbot 415. The network security scanner 460 may receive the custom network security testing code 450 directly from the chatbot 415 or indirectly via a website, FTP site, and/or other file hosting site.

In one aspect, the network security scanner 460 receives security vulnerability announcements. The network security scanner 460 security vulnerability announcements via e-mail messages, social media accounts, websites, and/or any other suitable communications medium. The security vulnerability announcements may be generated by an operating system vendor, an application vendor, a security organization, and/or any other source. The security vulnerability announcements may be common vulnerabilities and exposures format, common weakness enumeration format, any other standard format, and/or in unformatted text. The network security scanner 460 may transmit the security vulnerability announcements to the chatbot 415 and may prompt the chatbot 415 for updated custom network security testing code 450.

In a further aspect, the exemplary networking environment 400 may comprise one or more of the networked computing devices 440A-N. The networked computing devices 440A-N may include desktop computers, notebook computers, servers, tablets, smartphones, wearable devices, IoT devices, routers, and/or other electronic or electrical component that may communicate via one or more networks.

In one aspect, the exemplary networking environment 400 may comprise one or more firewalls 430. The firewall 430 may be any suitable device and include the client device 102, one or more desktop computers, laptop computers, server computers, routers, gateways, and/or other electronic or electrical component. The firewall 430 may include a memory and a processor for, respectively, storing and executing one or more modules. The memory may include one or more suitable storage media such as a magnetic storage device, a solid-state drive, random access memory (RAM), etc. The firewall 430 may include a plurality of network interfaces, such as a wired, wireless LAN, cellular, and/or any other suitable network interface. The firewall 430 may access services or other components of the networking environment 400 via the network interfaces. The firewall 430 may include software that, when executed, causes the firewall 430 to monitor, allow, and/or block network traffic. The firewall 430 may include a firewall policy that instructs the firewall 430 regarding what network traffic to allow and/or what network traffic to block.

In one aspect, the exemplary networking environment 400 may comprise any suitable network or networks, including a LAN, a WAN, Internet, or combination thereof.

The custom network security testing code 450 may cause the network security scanner 460 to scan the exemplary networking environment 400 for active network hosts, including the networked computing devices 440A-N. The network security scanner 460 may transmit TCP. UDP, ICMP, and/or other suitable network packets to one or more network addresses. The one or more network addresses may comprise a range of IP addresses. The network security scanner 460 may then listen for a response to the transmitted network packets from the one or more network addresses to identify active network hosts. The network security scanner 460 may passively listen to network traffic and identify active network hosts from a source network address and/or a destination network address. The network security scanner 460 may compile a list of active network hosts. The list of active network hosts may comprise network addresses, identified open TCP and/or UDP ports, identified server software, and/or identified operating systems. For example, network computing device 440B may be identified as having the IP address 192.168.100.1, running the RedHat Linux operating system, listening on TCP ports 80 and 443, and running Apache HTTP server. The network security scanner 460 may communicate the list of active network hosts to a user associated with the network security scanner 460.

The custom network security testing code 450 may cause the network security scanner 460 to scan the active network hosts, including the networked computing devices 440A-N, for one or more security vulnerabilities. The network security scanner 460 may scan the list of active network hosts for security vulnerabilities. The network security scanner 460 may tailor the scan of the active network hosts based upon the identified open TCP and/or UDP ports, server software, and/or operating systems. For example, network security scanner 460 may scan the network computing device 440B for vulnerabilities related to the RedHat Linux operating system and/or Apache HTTP server software. The network security scanner 460 may compile a list of identified security vulnerabilities. The list of identified security vulnerabilities may comprise identification of the vulnerable network computing devices, a description of the identified security vulnerabilities, a severity level of the identified security vulnerabilities, and/or recommendations for resolving the identified security vulnerabilities. The network security scanner 460 may communicate the list of identified security vulnerabilities to a user associated with the network security scanner 460.

The custom network security testing code 450 may cause the network security scanner 460 to transmit the list of identified security vulnerabilities to the firewall 430 and cause the firewall 430 to update a firewall policy. The network security scanner 460 may generate a revised firewall policy that attempts to mitigate the identified security vulnerabilities. The network security scanner 460 may communicate the revised firewall policy to a user associated with the firewall 430 and/or transmit the revised firewall policy to firewall 430.

Exemplary ML Model to Generate Abnormal Network Traffic Detection Code

In one embodiment, generating abnormal network traffic detection code may use ML. The generated abnormal network traffic detection code may be compiled or uncompiled.

Figure 5A:
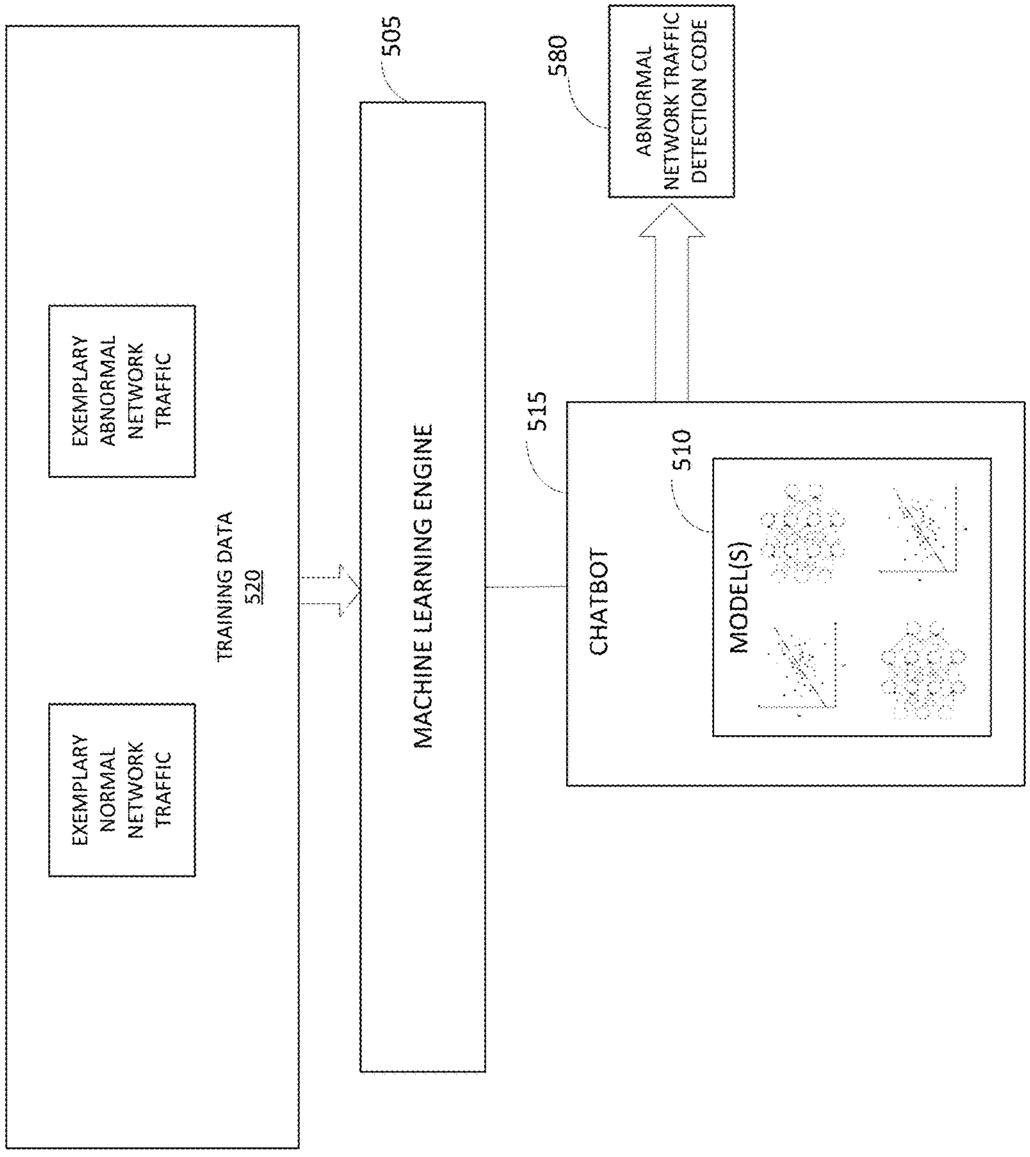
FIG. 5A depicts a combined block and logic diagram of an exemplary server generating abnormal network traffic detection code using generative AI/ML.

FIG. 5A schematically illustrates how an ML model may generate abnormal network traffic detection code 580. Some of the blocks in FIG. 5A represent hardware and/or software components (e.g., block 505), other blocks represent data structures or memory storing these data structures, registers, or state variables (e.g., blocks 520), and other blocks represent output data (e.g., block 580). Input and output signals are represented by arrows.

The abnormal network traffic detection code 580 may comprise source code. The abnormal network traffic detection code 580 may be written in the C, C++, C#, Visual Basic, Python, Java, JavaScript, or other programming languages. The abnormal network traffic detection code 580 may be a compiled executable that may run on Windows, Linux, Unix, MacOS, or other operating systems.

An ML engine 505 may include one or more hardware and/or software components, such as the MLTM 142 and/or the MLOM 144, to obtain, create, (re)train, operate and/or save one or more ML models 510. To generate an ML model 510, the ML engine 505 may use training data 520.

As described herein, the server such as server 105 may obtain and/or have available various types of training data 520 (e.g., stored on database 126 of server 105). In an aspect, the training data 520 may labeled to aid in training, retraining and/or fine-tuning the ML model 510. The training data 520 may include exemplary normal network traffic. The exemplary normal network traffic may comprise records of routine network traffic and/or traffic that does not raise security concerns. The training data 520 may include exemplary abnormal network traffic. The exemplary normal network traffic may comprise records of network traffic that is not routine and/or raises security concerns. The exemplary normal network traffic and/or exemplary abnormal network traffic may comprise records of one or more network protocols, such as TCP, UDP, ICMP. HTTP, SMTP, IMAP, POP3, DNS, or DHCP. The exemplary normal network traffic and/or exemplary abnormal network traffic may comprise logs from a packet analyzer, such as Wireshark or tcpdump, from an intrusion detection system, such as Snort, or from a firewall, such as Iptables.

The abnormal network traffic may be further classified into one or more categories of known security threats, including one or more of worms, port scanning, Log 4Shell, ProxyShell, ProxyLogon, ZeroLogon, SQL injection, LDAP injection, buffer overflows, stack overflows, cross-site scripting, remote code execution, command execution, elevation of privilege, and denial of service.

While the example training data includes indications of various types of training data 520, this is merely an example for ease of illustration only. The training data 520 may include any suitable data that may indicate associations between abnormal network traffic and abnormal network traffic detection code, as well as any other suitable data which may train the ML model 510 to generate the abnormal network traffic detection code 580.

In an aspect, the server may continuously update the training data 520, e.g., based upon obtaining records of normal network traffic and/or abnormal network traffic, feedback or data collected from abnormal network traffic detection, or any other training data. Subsequently, the ML model 510 may be retrained/fine-tuned based upon the updated training data 520. Accordingly, the generation of the abnormal network traffic detection code 580 may improve over time.

In an aspect, the ML engine 505 may process and/or analyze the training data 520 (e.g., via MLTM 142) to train the ML model 510 to generate the abnormal network traffic detection code 580. The ML model 510 may be trained to generate the abnormal network traffic detection code 580 via a large language model, neural network, deep learning model, Transformer-based model, GPT, GAN, regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

Once the abnormal network traffic detection code 580 is generated by the ML model 510, it may be provided to the client device 102 or to another computing device. For example, the server 105 may provide the abnormal network traffic detection code 580 in an email, a website, via a chatbot (such as the chatbot 515), and/or in any other suitable manner. The client device 102 may cause existing abnormal network traffic detection code to be replaced with the updated abnormal network traffic detection code 580.

Figure 5B:
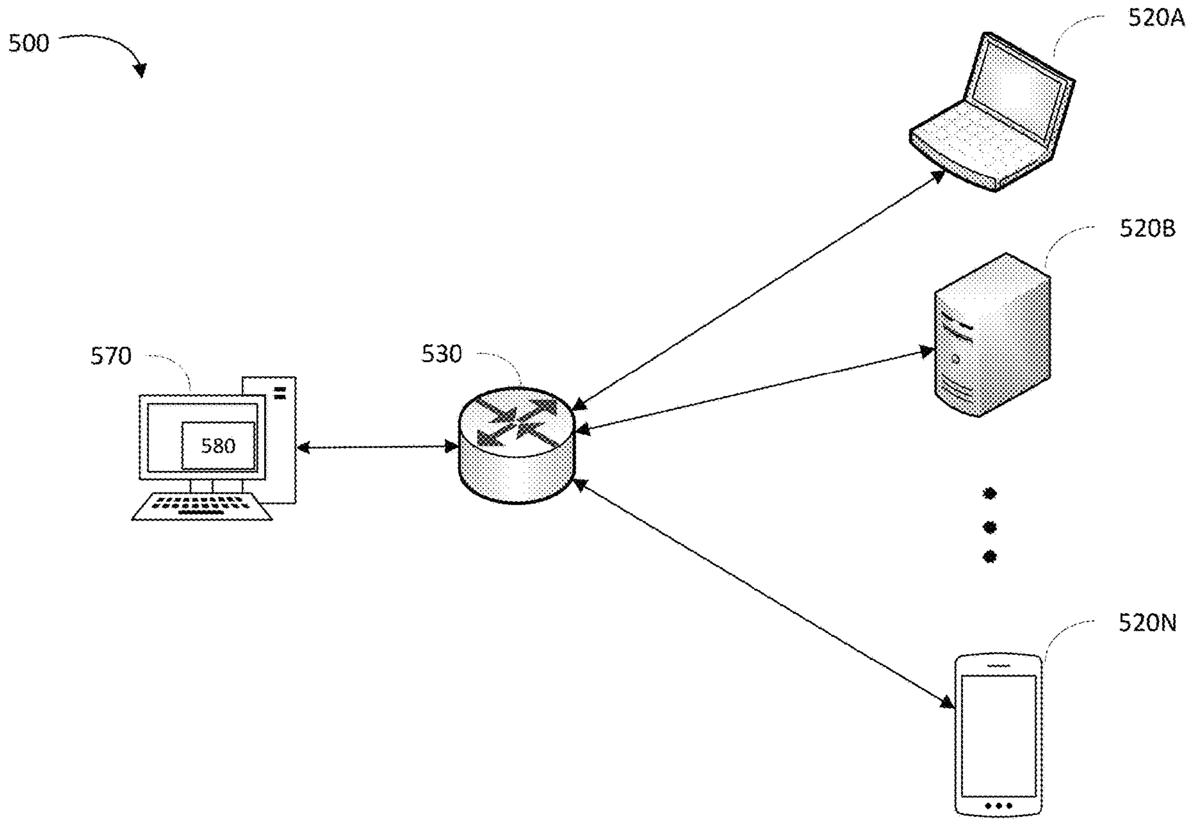
FIGS. 5B-5D depict exemplary networking environments for abnormal network traffic detection.
Figure 5C:
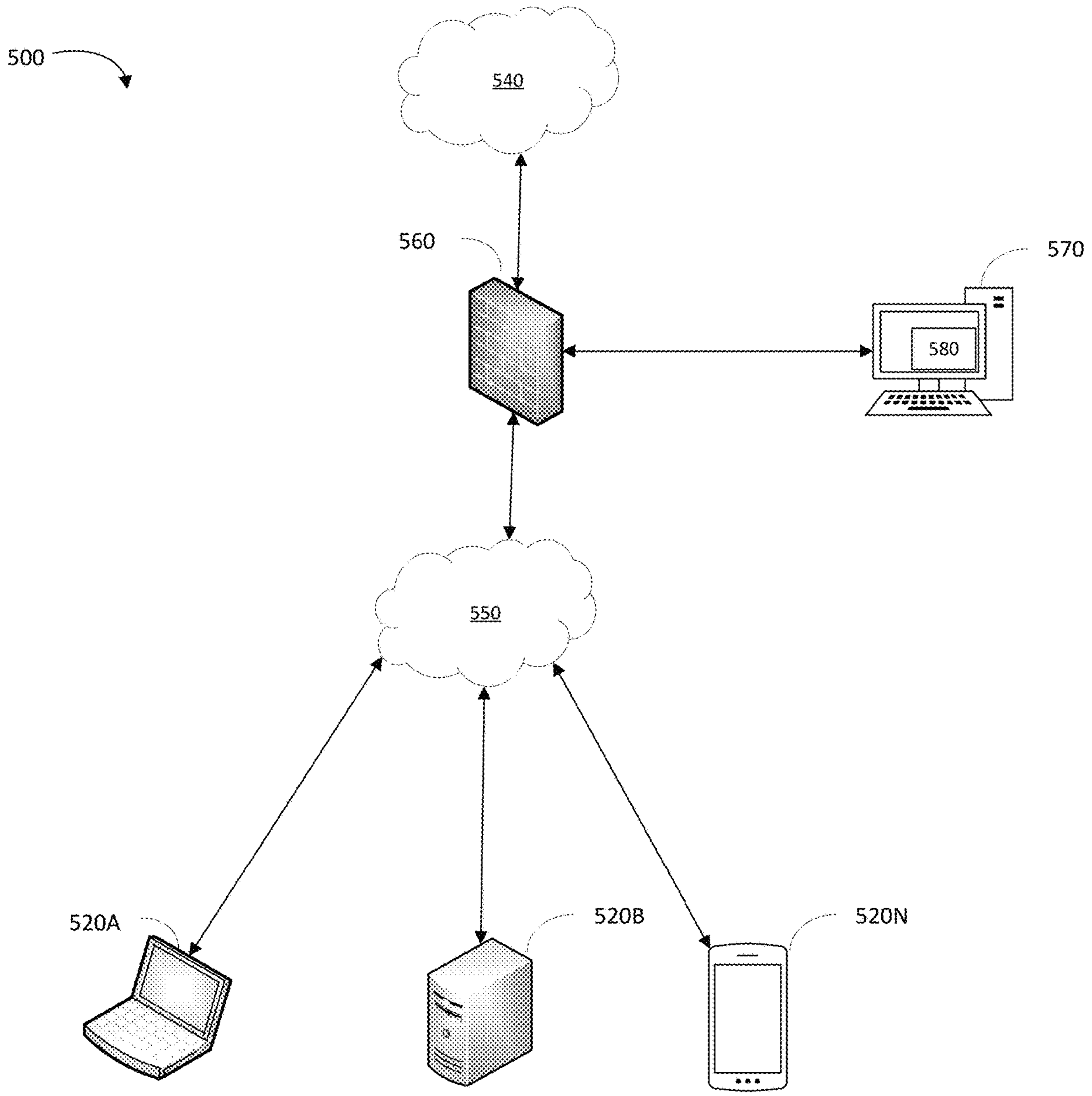
Figure 5D:
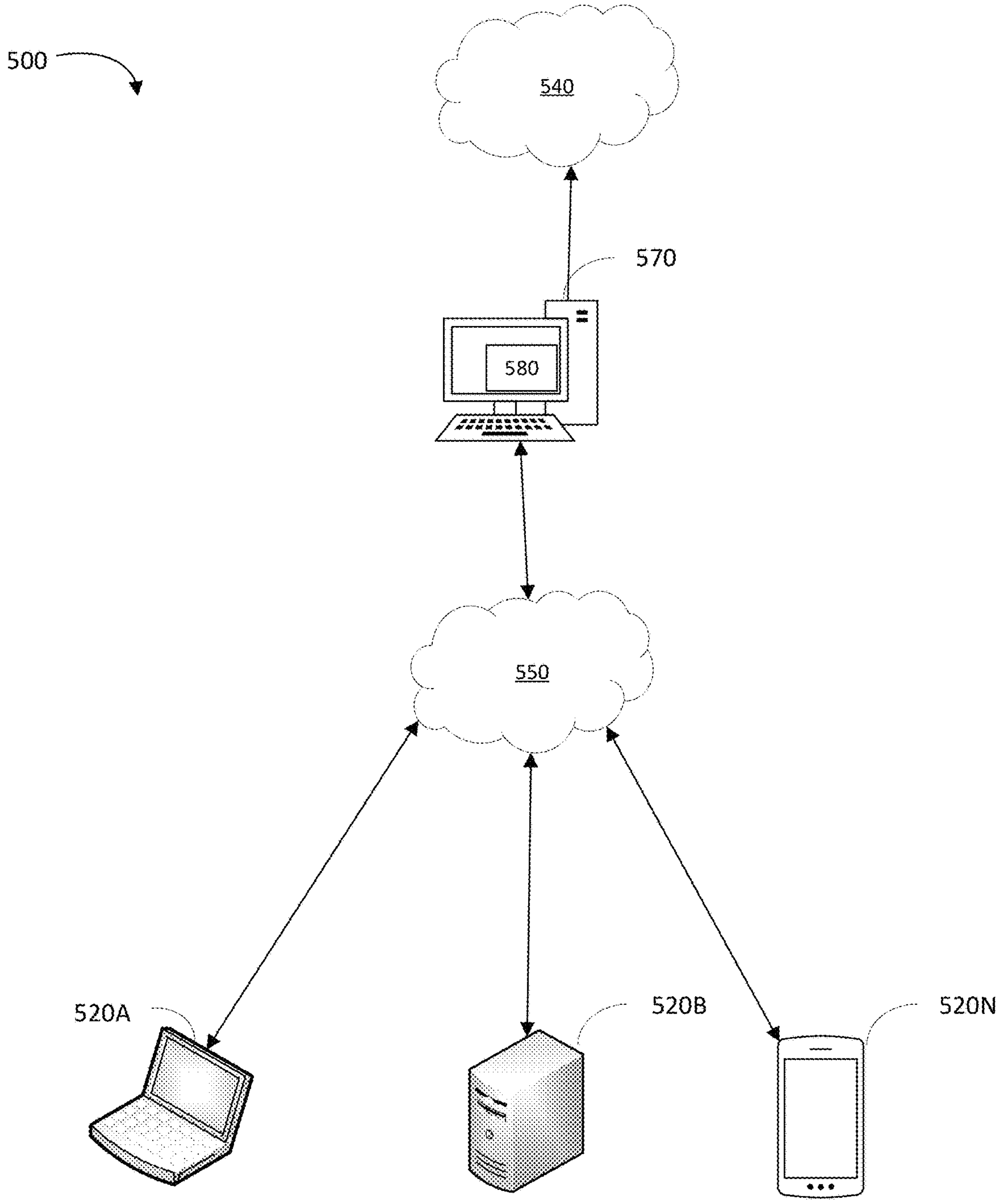

Exemplary Execution of Abnormal Network Traffic Detection Code to Identify Abnormal Network Traffic FIGS. 5B-5D illustrate an exemplary networking environment 500 in which methods and systems for identifying and/or classifying abnormal network traffic may be performed, in accordance with various aspects discussed herein. In one aspect, the exemplary networking environment 500 may comprise any suitable network or networks, including a LAN, a WAN, Internet, or combination thereof.

A traffic detection system 570 may execute the abnormal network traffic detection code 580 to listen to network traffic and identify and/or classify abnormal network traffic. Network communications are represented by arrows.

The traffic detection system 570 may be any suitable device and include the client device 102, one or more desktop computers, laptop computers, server computers, voice bots or chatbots 150, ChatGPT bots, and/or other electronic or electrical component. The traffic detection system 570 may include a memory and a processor for, respectively, storing and executing one or more modules. The memory may include one or more suitable storage media such as a magnetic storage device, a solid-state drive, random access memory (RAM), etc. The traffic detection system 570 may include one or more network interfaces, such as a wired, wireless LAN, cellular, and/or any other suitable network interface. The traffic detection system 570 may access services or other components of the networking environment 500 via the one or more network interfaces.

In one aspect, the traffic detection system 570 includes the abnormal network traffic detection code 580. The traffic detection system 570 may run the executable abnormal network traffic detection code 580. The traffic detection system 570 may compile the abnormal network traffic detection code 580 into an executable. The traffic detection system 570 may execute an interpreter to run the abnormal network traffic detection code 580.

In another aspect, the traffic detection system 570 receives abnormal network traffic detection code 580 from the chatbot 515. The traffic detection system 570 may receive the abnormal network traffic detection code 580 directly from the chatbot 515 or indirectly via a website, FTP site, and/or other file hosting site.

In a further aspect, the exemplary networking environment 500 may comprise one or more of the networked computing devices 520A-N. The networked computing devices 520A-N may include desktop computers, notebook computers, servers, tablets, smartphones, wearable devices, IoT devices, routers, and/or other electronic or electrical components that may communicate via one or more networks.

In one aspect, the abnormal network traffic detection code 580 may cause the traffic detection system 570 to analyze network traffic. The traffic detection system 570 may analyze the network, transport, session, presentation, and application layers of the network traffic. The traffic detection system 570 may track the state of a network connection between two network devices. By analyzing network traffic, the traffic detection system 570 may record a list of active network hosts, including networked computing devices 520A-N, what types of network traffic the active network hosts generate, and what types of network traffic the active network hosts receive. For example, the traffic detection system 570 may record that network computing devices 520A and 520N periodically send HTTP traffic to TCP port 80 of network computing device 520B. The traffic detection system 570 may use the recorded list to classify network traffic as normal network traffic or abnormal network traffic. The traffic detection system 570 may communicate the recorded list to a user associated with the traffic detection system 570.

In one example, the traffic detection system 570 may identify that network computing device 520A is now sending network packets to a plurality of TCP and UDP ports on network computing device 520B. The traffic detection system 570 may determine that this network traffic from network computing device 520A may be abnormal network traffic. The traffic detection system may further classify this abnormal network traffic as potential port scanning.

In a further aspect, the traffic detection system 570 may communicate an alert about the abnormal network traffic to a user associated with the traffic detection system 570. The traffic detection system 570 may perform one or more actions to block the abnormal network traffic.

FIG. 5B illustrates one embodiment of the exemplary networking environment 500. The exemplary networking environment 500 may comprise one or more network devices 530. The network devices 530 may include wireless access points, routers, switches, hubs, or any other suitable device. The network devices 530 may provide network connectivity for the traffic detection system 570 and/or the networked computing devices 520A-N.

In one aspect, the network devices 530 may be configured to forward a copy of all network traffic or a portion of network traffic to the traffic detection system 570. The forwarded copy of network traffic may include traffic sent or received by the networked computing devices 520A-N. The traffic detection system 570 may analyze the forwarded network traffic and/or detect abnormal network traffic.

For example, networked computing device 520A may be a client computing device, and networked computing device 520B may be a database server. The traffic detection system 570 may detect that the networked computing device 520A is now sending traffic to the networked computing device 520B destined for TCP port 1433, which traffic detection system 570 may identify as the default port for SQL server. The traffic detection system 570 may determine that this TCP port 1433 traffic may be abnormal network traffic because networked computing device 520A has never previously communicated with networked computing device 520B. Based on the abnormal network traffic determination, the traffic detection system 570 may transmit TCP RST packets to one or both of the networked computing devices 520A and 520B to terminate any TCP connection between the networked computing devices 520A and 520B. The traffic detection system 570 may cause reconfiguration of the network devices 530 such that they block some or all network traffic from networked computing device 520A.

FIG. 5C illustrates another embodiment of the exemplary networking environment 500. In one aspect, the exemplary networking environment 500 may comprise one or more firewalls 560. The firewall 560 may be any suitable device and include one or more desktop computers, laptop computers, server computers, routers, gateways, and/or other electronic or electrical component. The firewall 560 may include a memory and a processor for, respectively, storing and executing one or more modules. The memory may include one or more suitable storage media such as a magnetic storage device, a solid-state drive, random access memory (RAM), etc. The firewall 560 may include a plurality network interfaces, such as a wired, wireless LAN, cellular, and/or any other suitable network interface. The firewall 560 may access services or other components of the networking environment 500 via the network interfaces. The firewall 560 may include software that, when executed, causes the firewall 560 to monitor, allow, and/or block network traffic. The firewall 560 may include a firewall policy that instructs the firewall 560 regarding what network traffic to allow and/or what network traffic to block.

In one aspect, the firewall 560 may be connected to network 540 and connected to network 550. The network 540 may be a wide area network and/or a public network, such as the Internet. The network 550 may be a local area network and/or a private network. The firewall 560 may be a gateway between the network 540 and the network 550 such that all traffic between the networks flows through the firewall 560.

The traffic detection system 570 may be directly connected to the firewall 560 via a dedicated network interface on the firewall 560. The traffic detection system 570 may be connected to firewall 560 via network 540 or network 550.

In another aspect, the firewall 560 may be configured to forward a copy of all network traffic or a portion of network traffic to the traffic detection system 570. The forwarded copy of network traffic may include traffic from network 540 to network 550 or traffic from network 550 to network 540. The forwarded copy of network traffic may include traffic sent or received by the networked computing devices 520A-N. The traffic detection system 570 may analyze the forwarded network traffic and/or detect abnormal network traffic.

For example, networked computing device 520B may be a web server. The traffic detection system 570 may detect that the networked computing device 520B is now sending traffic to an unknown network host on the network 540 on TCP port 22, which the traffic detection system 570 may recognize is the default port for scp and ssh. The traffic detection system 570 may determine that this TCP port 22 traffic may be abnormal network traffic because networked computing device 520A has never previously communicated on TCP port 22. Based on the abnormal network traffic determination, the traffic detection system 570 may cause reconfiguration of the firewall policy on the firewall 560. The traffic detection system 570 may transmit a reconfigured firewall policy to the firewall 560. The traffic detection system 570 may instruct the firewall 560 to reconfigure its firewall policy. The reconfigured firewall policy may block some or all traffic to and/or from the unknown network host and/or the networked computing device 520B.

FIG. 5D illustrates another embodiment of the exemplary networking environment 500. In one aspect, the traffic detection system 570 may include a plurality network interfaces, such as a wired, wireless LAN, cellular, and/or any other suitable network interface. The traffic detection system 570 may be connected to network 540 and connected to network 550. The traffic detection system 570 may be a gateway between the network 540 and the network 550 such that all traffic between the networks flows through the traffic detection system 570. The traffic detection system 570 may analyze the network traffic flowing through traffic detection system 570 and/or classify network traffic. Upon detection of abnormal network traffic, such as between an unknown network host on the network 540 and one or more of the networked computing devices 520A-N, the traffic detection system 570 may cease forwarding some or all of the network traffic between the unknown host and the networked computing devices 520A-N. The traffic detection system 570 may cease forwarding by preventing one or more network interfaces from transmitting some or all of the network traffic.

Exemplary ML Model for Privacy Inspection and Enforcement of Unstructured Data

In one embodiment, inspecting unstructured data and detecting privacy violations may use ML.

Figure 6A:
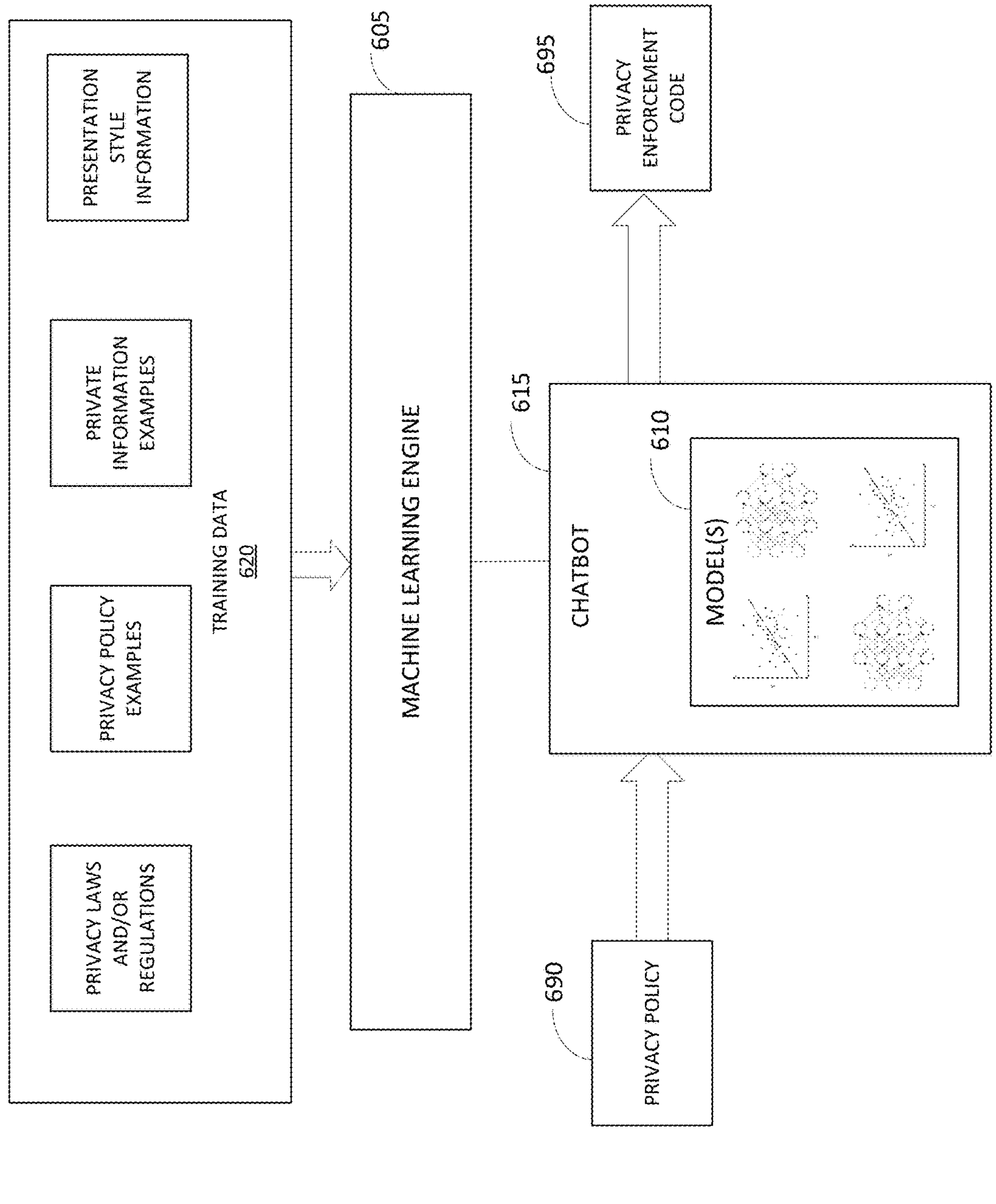
FIG. 6A depicts a combined block and logic diagram of an exemplary server generating privacy enforcement code using generative AI/ML.

FIG. 6A schematically illustrates how an ML model may generate privacy enforcement code to inspect for privacy violations. Some of the blocks in FIG. 6A represent hardware and/or software components (e.g., block 605), other blocks represent data structures or memory storing these data structures, registers, or state variables (e.g., blocks 620), and other blocks represent output data (e.g., block 695). Input and output signals are represented by arrows.

An ML engine 605 may include one or more hardware and/or software components, such as the MLTM 142 and/or the MLOM 144, to obtain, create, (re)train, operate and/or save one or more ML models 610. To generate an ML model 610, the ML engine 605 may use training data 620.

As described herein, the server such as server 105 may obtain and/or have available various types of training data 620 (e.g., stored on database 126 of server 105). In an aspect, the training data 620 may labeled to aid in training, retraining and/or fine-tuning the ML model 610. The training data 620 may include privacy laws and/or regulations. The privacy laws and/or regulations may include one or more federal, state, and/or international laws and/or regulations, such as the Health Insurance Portability and Accountability Act (HIPAA), Children's Online Privacy Protection Act (COPPA), California Consumer Privacy Act (CCPA), Personal Information Protection and Electronic Documents Act (PIPEDA), and General Data Protection Regulation (GDPR). The privacy laws and/or regulations may comprise the unstructured text of the laws and/or regulations or may be in a structured or rules-based format. New privacy laws/and or regulations describing recently enacted privacy legislations and/or regulations may be used to retrain or update the ML model 610.

The training data 620 may also include privacy policy examples. For instance, the privacy policy examples may include one or more organizations' policies for collecting, storing, transferring, and/or deleting private data. The privacy policy examples may apply to customers, patients, employees, etc. The privacy policy examples may specify rules and limitations for implementing compliance with one or more privacy laws/and or regulations. The privacy policy examples may comprise unstructured text or may be in a structured or rules-based format. New or updated privacy policy examples may be used to retrain or update the ML model 610.

The training data 620 may also include private information examples. For instance, the private information examples may include social security numbers, financial account numbers, credit scores, medical diagnoses, etc. An ML model may process this type of training data 620 to derive associations between the privacy laws and/or regulations and/or the privacy policy examples and the private information examples. For example, the HIPAA Privacy Rule may restrict the use and disclosure of Protected Health Information (PHI) that has not been deidentified. Based upon the privacy laws and/or regulations comprising the HIPAA Privacy Rule and the private information examples comprising PHI, the ML model 610 may generate privacy enforcement code for detecting potential HIPAA Privacy Rule violations.

While the example training data includes indications of various types of training data 620, this is merely an example for ease of illustration only. The training data 620 may include any suitable data that may indicate associations between privacy policies and private information, as well as any other suitable data which may train the ML model 610 to generate the privacy enforcement code 695.

In an aspect, the server may continuously update the training data 620, e.g., based upon obtaining additional privacy laws and/or regulations, updated or additional privacy policy examples, feedback or data collected from prior privacy inspections, or any other training data. Subsequently, the ML model 610 may be retrained/fine-tuned based upon the updated training data 620. Accordingly, generation of the privacy policy enforcement code 695 may improve over time.

In an aspect, the ML engine 605 may process and/or analyze the training data 620 (e.g., via MLTM 142) to train the ML model 610 to generate the privacy policy enforcement code 695. The ML model 610 may be trained to generate the privacy policy enforcement code 695 via a large language model, neural network, deep learning model, Transformer-based model, GPT, GAN, regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

In an aspect, the ML engine 605 may process and/or analyze the training data 620 (e.g., via MLTM 142) to train the ML model 610 to generate privacy policy enforcement code 695 that deletes or redacts data segments comprising potential privacy violations. The ML model 610 may generate privacy policy enforcement code 695 that scans a data store, such as a database. The ML model 610 may generate privacy policy enforcement code 695 that scans data received by an application prior to storage in a data store.

Once trained, the ML model 610 may perform operations on one or more data inputs to produce a desired data output. In one aspect, the ML model 610 may be loaded at runtime (e.g., by the MLOM 144) from a database (e.g., the database 126 of the server 105) to process privacy policy 690 data input. The server, such as server 105, may obtain the privacy policy 690 and use it as an input to generate the privacy policy enforcement code 695. In one aspect, the server may obtain the privacy policy 690 via the client device 102 (e.g., of the privacy enforcement manager) via a website, the chatbot 150, or any other suitable user device. The privacy policy 690 may include one or more text documents.

In an aspect, the privacy enforcement code 695 may comprise instructions to cause one or more computing devices to inspect unstructured data for potential privacy violations. For example, the privacy enforcement code 695 may include one or more rule sets, scripts, source code files, and/or compiled executables.

In one aspect, the ML model 610 may weigh one or more attributes of the privacy policy 690 such that they may be of unequal importance. For example, the privacy policy 690 may rules for deleting former employees' human resources data after three years and rules for GDPR compliance with transferring customer data outside of Europe. Retention of former employees' human resources data may be judged less critical than a GDPR violation. Thus, the ML model 610 may apply an increased severity score to the human resource data potential violation versus the GDPR potential violation.

In one embodiment, the ML model 610 may use a regression model to determine a severity score associated with a potential privacy violation based upon the privacy laws and/or regulations and/or the privacy policy examples, which may be a preferred model in situations involving scoring output data. In one aspect, the ML model 610 may rank the potential privacy violations based upon the severity scores.

Once the privacy enforcement code 695 is generated by ML 610, it may be provided to the client device 102 or to another user device. For example, the server 105 may provide the privacy enforcement code 695 via a mobile app to a mobile device, in an email, a website, via a chatbot (such as the chatbot 615), and/or in any other suitable manner. The client device 102 may cause existing privacy enforcement code to be replaced with updated privacy enforcement code 695. The client device 102 may cause the privacy enforcement code 695 to be compiled to generate an executable.

Generative AI/ML may enable a computer, such as the server 105, to use existing data (e.g., as an input and/or training data) such as text, audio, video, images, and/or code, among other things, to generate new content, such as a potential privacy violations presentation customized for an organization, via one or more models. Generative ML may include unsupervised and semi-supervised ML algorithms, which may automatically discover and learn patterns in input data. Once trained, e.g., via MLTM 142, a generative ML model may generate content as an output which plausibly may have been drawn from the original input dataset and may include the content in the customized presentation. In one aspect, an ML chatbot such as chatbot 150 may include one or more generative AI/ML models.

Some types of generative AI/ML may include generative adversarial networks (GANs) and/or transformer-based models. In one aspect, the GAN may generate images, visual and/or multimedia content from image and/or text input data. The GAN may include a generative model (generator) and discriminative model (discriminator). The generative model may produce an image which may be evaluated by the discriminative model and use the evaluation to improve operation of the generative model. The transformer-based model may include a generative pre-trained language model, such as the pre-trained language model used in training ML chatbot model 250 described herein. Other types of generative AI/ML may use the GAN, the transformer model, and/or other types of models and/or algorithms to generate: (i) realistic images from sketches, which may include the sketch and object category as input to output a synthesized image; (ii) images from text, which may produce images (realistic, paintings, etc.) from textual description inputs; (iii) speech from text, which may use character or phoneme input sequences to produce speech/audio outputs; (iv) audio, which may convert audio signals to two-dimensional representations (spectrograms) which may be processed using algorithms to produced audio; and/or (v) video, which may generate and convert video (i.e., a series of images) using image processing techniques and may include predicting what the next frame in the sequence of frames/video may look like and generating the predicted frame. With the appropriate algorithms and/or training, generative AI/ML may produce various types of multimedia output and/or content which may be incorporated into a customized presentation, e.g., via an AI and/or ML chatbot (or voice bot).

In one aspect, an enterprise may use the AI and/or ML chatbot, such as the trained chatbot 150, to generate one or more customized components of the customized presentation to walk a user through the potential privacy policy violations. The trained ML chatbot may generate output such as images, video, slides (e.g., a PowerPoint slide), virtual reality, augmented reality, mixed reality, multimedia, blockchain entries, metaverse content, or any other suitable components which may be used in the customized presentation.

Once trained, the ML chatbot which may include on one more generative AI/ML models such as those described may be able to generate the customized presentation based upon one or more prompts, such as a prompt for privacy enforcement. In response, the ML chatbot may generate audio/voice/speech, text, slides, and/or other suitable content which may be included in the customized presentation.

In one aspect, the training data 620 may include presentation style information such as images, text, phonemes, audio, or other types of data which may be used as inputs as discussed herein for training one or more AI/ML models to generate different types of presentation components. The training data 620 may include style information related to a particular style (e.g., fonts, logos, emblems, colors, etc.) an organization would like the customized presentation components to emulate. The training data 620 may include user profile information which may affect customizing the presentation for a particular user or organization, e.g., the sophistication level of a particular user. The training data 620 may include historical privacy violations, e.g., based upon past identified privacy violations, that may be relevant to include in the customized presentation for a similar type of identified privacy violation. While the example training data 620 includes indications of various types of data, this is merely an example for ease of illustration only. The training data 620 may include any data relevant to generating the customized presentation of the identified privacy violations.

In one aspect, the server 105 may obtain the privacy policy 690, e.g., as input from client device 102, as well as any other suitable manner of obtaining the privacy policy 690. In one aspect, the user for whom the privacy enforcement code 695 is being generated provides the privacy policy 690 via the chatbot 615, e.g., using a web interface. In one embodiment, the user copies and pastes text from the privacy policy 690 into a dialog box of a web interface. In another embodiment, the user uploads one or more files containing the privacy policy 690. The privacy policy 690 may be provided as an input to the one or more ML models 610 and/or chatbots 615. The one or more chatbots 615 and/or ML models 610 may employ one or more AI/ML models (e.g., SFT ML model, GAN, pre-trained language models, etc.) and/or algorithms (e.g., supervised learning, unsupervised learning, semi-supervised learning, and/or reinforcement learning) discussed herein to generate the privacy enforcement code 695, which in turn generates the customized presentation of potential privacy violations. For example, a user may provide the privacy policy 690 and request the privacy enforcement code 695. One or more ML models 610 and/or chatbots 615 may generate the privacy enforcement code 695 to use style information such as colors, fonts and/or logos associated with an organization, among other things, when generating the customized presentation of potential privacy violations.

In one aspect, the organization may create updated organization style information which may affect the look of newly generated customized presentation of potential privacy violations. Subsequently, one or more ML models 610 may be retrained (e.g., via MLTM 142) based upon updated training data 620.

Figure 6B:
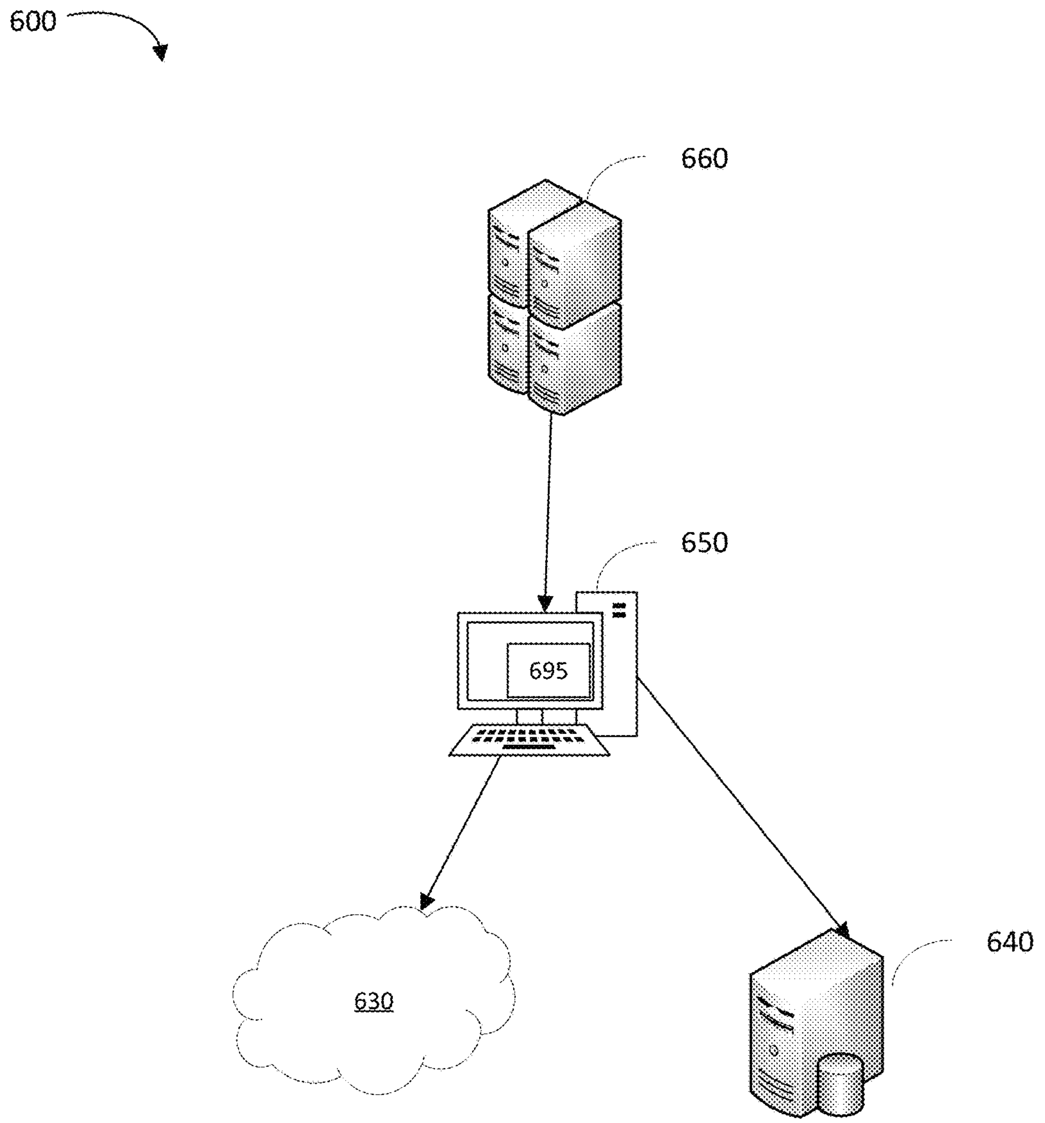
FIG. 6B depicts an exemplary computing enforcement for privacy inspection and privacy policy enforcement.

Exemplary Execution of Privacy Enforcement Code to Scan for Potential Privacy Violations FIG. 6B illustrates an exemplary computing environment 600 in which methods and systems for privacy inspection and enforcement may be performed, in accordance with various aspects discussed herein.

A privacy enforcement scanner 650 may execute the privacy enforcement code 695 to identify one or more potential privacy violations and/or enforce a privacy policy in unstructured data. Data transfers and inspections are represented by arrows.

The privacy enforcement scanner 650 may be any suitable device and include the client device 102, one or more desktop computers, laptop computers, server computers, voice bots or chatbots 150, ChatGPT bots, and/or other electronic or electrical component. The privacy enforcement scanner 650 may include a memory and a processor for, respectively, storing and executing one or more modules. The memory may include one or more suitable storage media such as a magnetic storage device, a solid-state drive, random access memory (RAM), etc. The privacy enforcement scanner 650 may include one or more network interfaces, such as a wired, wireless LAN, cellular, and/or any other suitable network interface. The privacy enforcement scanner 650 may access services or other components of the networking environment 600 via the network interface.

In one aspect, the privacy enforcement scanner 650 includes the privacy enforcement code 695. The privacy enforcement scanner 650 may run the executable privacy enforcement code 695. The privacy enforcement scanner 650 may compile the privacy enforcement code 695 into an executable. The privacy enforcement scanner 650 may execute an interpreter to run the privacy enforcement code 695. The privacy enforcement scanner 650 may execute privacy inspection software to run the privacy enforcement code 695.

In another aspect, the privacy enforcement scanner 650 receives the privacy enforcement code 695 from the chatbot 615. The privacy enforcement scanner 650 may receive the privacy enforcement code 695 directly from the chatbot 615 or indirectly via a website, FTP site, and/or other file hosting site.

In one aspect, the privacy enforcement scanner 650 receives new privacy laws and/or regulations and/or updated privacy policies. The privacy enforcement scanner 650 may receive new privacy laws and/or regulations via e-mail messages, social media accounts, websites, and/or any other suitable communications medium. The new privacy laws and/or regulations may be communicated by government entity, a privacy organization, and/or any other source. The new privacy laws and/or regulations and/or updated privacy policies may be in a standard or rules-based format, and/or in unformatted text. The privacy enforcement scanner 650 may transmit the privacy laws and/or regulations and/or updated privacy policies to the chatbot 615 and may prompt the chatbot 615 for updated privacy enforcement code 695.

In a further aspect, the exemplary computing environment 600 may comprise one or more application servers 660. The application servers 660 may include World Wide Web servers, e-mail servers, customer relationship management servers, servers running business applications, servers running middleware, or any server running an application that collects data.

In one aspect, the exemplary computing environment 600 may comprise one or more cloud services 630. The cloud services 630 may comprise a public cloud computing environment, a private cloud computing environment, and/or a hybrid cloud computing environment. For example, an entity (e.g., a business) may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premises cloud (i.e., not physically hosted at a location owned/controlled by the business). Alternatively, or in addition, aspects of the public cloud may be hosted on-premises at a location owned/controlled by an entity. The public cloud may be partitioned using visualization and multi-tenancy techniques and may include one or more infrastructure-as-a-service (IaaS) and/or platform-as-a-service (PaaS) services. The cloud services 630 may host customer data, documents, and/or files. In a further aspect, the exemplary computing environment 600 may comprise one or more database servers 640. The database servers 640 may operate a relational database, such as Oracle, DB2, MySQL, a NoSQL based database, such as MongoDB, or another suitable database. The database servers 640 may host documents and/or files.

In one aspect, the exemplary computing environment 600 may comprise any suitable network or networks, including a LAN, a WAN, Internet, or combination thereof.

The privacy enforcement code 695 may cause the privacy enforcement scanner 650 to scan a set of unstructured data in the cloud 630 and/or the database servers 640 for potential violations of a privacy policy. The privacy enforcement scanner 650 may have login or other access credentials for the cloud 630 and/or the database server 640 to access the set of unstructured data. The set of unstructured data may comprise one or more documents, files, and/or text fields in a database.

The privacy enforcement code 695 may cause privacy enforcement scanner 650 to scan a set of unstructured data being transferred from the application servers 660 to the cloud 630 and/or the database servers 640 for potential violations of a privacy policy. The privacy enforcement code 695 may cause privacy enforcement scanner 650 to scan a set of unstructured data being transferred from the cloud 630 and/or the database servers 640 to the application servers 660 for potential violations of a privacy policy. The privacy enforcement scanner 650 may cache or temporarily store the transferred unstructured data before scanning the data.

The privacy enforcement scanner 650 may perform pattern recognition in the set of unstructured data to identify private information. The privacy enforcement scanner 650 may determine that the existence of a type of private information, e.g., full social security numbers, violates the privacy policy. The privacy enforcement scanner 650 may determine that the coexistence of a plurality of types of private information, e.g., name and medical diagnosis, violates the privacy policy. The privacy enforcement scanner 650 may cause the deletion or redaction of private information comprising potential privacy violations from the set of unstructured data. The privacy enforcement scanner 650 may communicate a list of potential privacy violations to a user associated with the privacy enforcement scanner 650.

Figure 7:
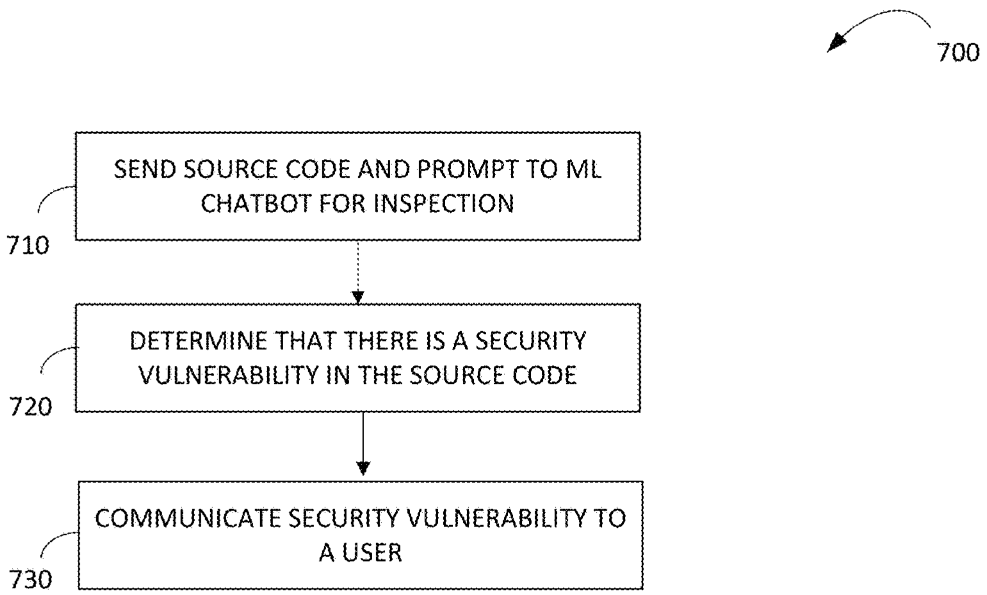
FIG. 7 depicts an exemplary computer-implemented method for source code vulnerability inspection.

Exemplary Computer-Implemented Method for Inspecting Source Code for Security Vulnerabilities FIG. 7 depicts a flow diagram of an exemplary computer-implemented method 700 for inspecting source code for security vulnerabilities. One or more steps of the method 700 may be implemented as a set of instructions stored on a computer-readable memory and executable on one or more processors. The method 700 of FIG. 7 may be implemented via a system, such as the server 105 and/or the network security scanner 460, traffic detection system 570, privacy enforcement scanner 650.

In one embodiment, the computer-implemented method 700 may include training an ML model (such as any of the ML modules or models 140, 310, 410, 510, 610) with a training dataset (such as training data 320) and/or validating the ML model with a validation dataset. The training dataset and/or the validation dataset may comprise documents describing a security vulnerability, example source code comprising the security vulnerability, and/or example source code lacking the security vulnerability.

In one embodiment, the computer-implemented method 700 may include at block 710 sending source code (such as the source code 340) and a prompt for code checking to an ML chatbot to cause the ML model to inspect the source code for security vulnerabilities. The source code and prompt for code checking may be sent via an application, chat session, e-mail, FTP. HTTP, HTTPS, and/or any other suitable communication method. The sending of the source code and prompt for code checking may be manually triggered by a user or automatically triggered, such as when a new version of code is saved or on a periodic basis. The ML model may inspect the source code using one or more test cases for security vulnerabilities. The security vulnerabilities may comprise one or more of out-of-bounds read and write of buffers or stacks, improper restriction of operations within the bounds of a memory buffer, cross-site scripting, SQL injection, LDAP injection, command injection, code injection, improper input validation, use after free, path traversal, cross-site request forgery, unrestricted upload of files with a dangerous type, NULL pointer dereference, deserialization of untrusted data, integer overflow or wraparound, improper authentication, hard-coded credentials, missing authorization, missing authentication for critical function, incorrect default permissions, server-side request forgery, race conditions, uncontrolled resource consumption, and improper restriction of XML external entity reference.

The test cases may be based upon data collected from one or more past source code inspections. The test cases may be generated based upon security vulnerability announcements. The security vulnerability announcements may be in text format, common weakness enumeration format, and/or common vulnerability exposures format. The prompt for code checking may cause the ML model to determine that there is a fix for one or more identified security vulnerabilities (such as the identified security vulnerabilities 350). The prompt for code checking may cause the ML model to generate corrected source code (such as corrected source code 360) comprising the fix.

In one embodiment, the computer-implemented method 700 at block 720 may include determining that there is a security vulnerability in the source code based on the response from the ML chatbot. The response from the ML chatbot may be sent via a text message, application, e-mail, FTP, HTTP, HTTPS, and/or any other suitable communication method. The response from the ML chatbot may comprise text identifying one or more portions of vulnerable source code and one or more identifiers of security vulnerabilities (such as the identified security vulnerabilities 350). The response from the ML chatbot may include the corrected source code.

In one embodiment, responsive to determining that there is a security vulnerability at block 720, the computer-implemented method 700 at block 730 may include communicating the security vulnerability to a user associated with the source code. The communication to the user may be sent via a text message, chat session, application, e-mail, FTP, HTTP, HTTPS, and/or any other suitable communication method. The communication may be in text format or may be a stylized presentation. The communication may identify the vulnerable portions of the source code, a description of the security vulnerabilities, and/or an explanation of techniques for resolving the identified vulnerabilities. The communication may include the fix for the security vulnerability.

In one embodiment, the computer-implemented method 700 may further include replacing the source code in the application with the corrected source code to generate a new version of the application. The application may be an insurance application.

It should be understood that not all blocks of the exemplary flow diagram 700 are required to be performed. Moreover, the exemplary flow diagram 700 is not mutually exclusive (i.e., block(s) from exemplary flow diagram 700 may be performed in any particular implementation).

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods may be illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments may be described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity that may be physically constructed, permanently configured (e.g., hardwired), or temporarily configured (e.g., programmed) to operate in a certain manner or to perform certain operations described herein. Considering embodiments in which hardware modules may be temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In some embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing." "computing," "calculating," "determining." "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising." "includes." "including." "has." "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed:

1. A computer-implemented method for inspecting source code to be used in an application for security vulnerabilities, the method comprising:

- sending the source code and a prompt for code checking to a machine learning (ML) chatbot to cause an ML model to inspect the source code for security vulnerabilities using test cases for the security vulnerabilities, wherein the test cases are generated by the ML model based upon data collected from one or more past source code inspections;
- determining that there is at least one security vulnerability in the source code based upon a response from the ML chatbot, and
- responsive to determining that there is at least one security vulnerability in the source code:
  - determining a severity score for the security vulnerability,
  - identifying a particular security vulnerability to correct based upon the severity score, and
  - causing the ML chatbot to:
    - determine that there is a fix for the particular security vulnerability, and
    - generate corrected source code that comprises the fix,
  - communicating the fix to a user, and
  - receiving the corrected source code from the ML chatbot.

2. The computer-implemented method of claim 1, further comprising: replacing the source code in the application with the corrected source code to generate a new version of the application.

3. The computer-implemented method of claim 1, further comprising:

training the ML model with a training dataset; and validating the ML model with a validation dataset, wherein the training dataset and the validation dataset comprise documents describing one or more security vulnerabilities and example source code lacking the one or more security vulnerabilities.

4. The computer-implemented method of claim 1, wherein the security vulnerabilities comprise one or more of SQL injection, LDAP injection, buffer overflows, stack overflows, and cross-site scripting.

5. A computer system for security vulnerability inspection for a source code to be used in an application, the computer system comprising:

one or more processors; and a memory storing executable instructions thereon that, when executed by the one or more processors, cause the one or more processors to:

send the source code and a prompt for code checking to a machine learning (ML) chatbot to cause an ML model to inspect the source code for security vulnerabilities using test cases for the security vulnerabilities, wherein the test cases are generated by the ML model based upon data collected from one or more past source code inspections, determine that there is at least one security vulnerability in the source code based upon a response from the ML chatbot, and responsive to determining that there is at least one security vulnerability in the source code:

determine a severity score for the security vulnerability, identify a particular security vulnerability to correct based upon the severity score, and cause the ML chatbot to:

determine that there is a fix for the particular security vulnerability, and generate corrected source code that comprises the fix, communicate the fix to a user, and receive the corrected source code from the ML chatbot.

6. The computer system of claim 5, wherein the test cases are generated based upon security vulnerability announcements in text format, common weakness enumeration format, and/or common vulnerability exposures format.

7. The computer system of claim 5, wherein the instructions, when executed by the one or more processors, further cause the one or more processors to replace the source code in the application with the corrected source code to generate a new version of the application.

8. The computer system of claim 5, wherein the instructions, when executed by the one or more processors, further cause the one or more processors to:

train the ML model with a training dataset, and validate the ML model with a validation dataset, wherein the training dataset and the validation dataset comprise documents describing one or more security vulnerabilities and example source code lacking the one or more security vulnerabilities.

9. The computer system of claim 5, wherein the security vulnerabilities comprise one or more of SQL injection, LDAP injection, buffer overflows, stack overflows, and cross-site scripting.

10. The computer system of claim 5, wherein the application is an insurance application.

11. A tangible, non-transitory computer-readable storage medium storing computer-executable instructions for generating customized code for inspecting source code to be used in an application for security vulnerabilities, wherein the instructions when executed on one or more processors cause the one or more processors to:

send the source code and a prompt for code checking to a machine learning (ML) chatbot to cause an ML model to inspect the source code for security vulnerabilities using test cases for the security vulnerabilities, wherein the test cases are generated by the ML model based upon data collected from one or more past source code inspections, determine that there is at least one security vulnerability in the source code based upon a response from the ML chatbot, and responsive to determining that there is at least one security vulnerability in the source code:

determine a severity score for the security vulnerability, identify a particular security vulnerability to correct based upon the severity score, and cause the ML chatbot to:

determine that there is a fix for the particular security vulnerability, and generate corrected source code that comprises the fix, communicate the fix to a user, and receive the corrected source code from the ML chatbot.

12. The tangible, non-transitory computer-readable storage medium of claim 11, wherein the computer-executable instructions, when executed by the one or more processors, further cause the one or more processors to replace the source code in the application with the corrected source code to generate a new version of the application.

13. The tangible, non-transitory computer-readable storage medium of claim 11, wherein the computer-executable instructions, when executed by the one or more processors, further cause the one or more processors to:

train the ML model with a training dataset; and validate the ML model with a validation dataset, wherein the training dataset and the validation dataset comprise documents describing one or more security vulnerabilities and example source code lacking the one or more security vulnerabilities.

14. The tangible, non-transitory computer-readable storage medium of claim 11, wherein the security vulnerabilities comprise one or more of SQL injection, LDAP injection, buffer overflows, stack overflows, and cross-site scripting.

* * * * *